(12) United States Patent
Whittlesey et al.

(10) Patent No.: US 7,623,786 B2
(45) Date of Patent: Nov. 24, 2009

(54) SYSTEM AND METHOD FOR COMMUNICATING OPTICAL SIGNALS TO MULTIPLE SUBSCRIBERS HAVING VARIOUS BANDWIDTH DEMANDS CONNECTED TO THE SAME OPTICAL WAVEGUIDE

(75) Inventors: Paul F. Whittlesey, Sugar Hill, GA (US); Emmanuel A. Vella, Alpharetta, GA (US); James O. Farmer, Lilburn, GA (US)

(73) Assignee: Enablence USA FTTX Networks, Inc., Alpharetta, GA (US)

( * ) Notice: Subject to any disclaimer, the term of this patent is extended or adjusted under 35 U.S.C. 154(b) by 0 days.

(21) Appl. No.: 11/784,187

(22) Filed: Apr. 5, 2007

(65) Prior Publication Data

US 2007/0292133 A1 Dec. 20, 2007

Related U.S. Application Data

(63) Continuation of application No. 10/151,490, filed on May 20, 2002, now Pat. No. 7,218,855.

(51) Int. Cl.
*H04B 10/00* (2006.01)

(52) U.S. Cl. .............................. 398/72; 398/66; 398/71; 398/70

(58) Field of Classification Search .............. 398/66–72
See application file for complete search history.

(56) References Cited

U.S. PATENT DOCUMENTS

| 4,253,035 | A |   | 2/1981  | Amitay          |         |
|-----------|---|---|---------|-----------------|---------|
| 4,295,005 | A |   | 10/1981 | Daugherty et al.|         |
| 4,495,545 | A |   | 1/1985  | Dufresne et al. |         |
| 4,500,990 | A |   | 2/1985  | Akashi          |         |
| 4,654,891 | A |   | 3/1987  | Smith           |         |
| 4,665,517 | A |   | 5/1987  | Widmer          |         |
| 4,733,398 | A |   | 3/1988  | Shibagaki et al.|         |
| 4,763,317 | A | * | 8/1988  | Lehman et al.   | 370/358 |
| 4,805,979 | A |   | 2/1989  | Bossard et al.  |         |
| 4,852,023 | A |   | 7/1989  | Lee et al.      |         |
| 4,891,694 | A | * | 1/1990  | Way             | 725/114 |

(Continued)

FOREIGN PATENT DOCUMENTS

CA            2107922        4/1995

(Continued)

OTHER PUBLICATIONS

Partial International Search Report dated Jan. 3, 2003 for PCT/US01/31032.

(Continued)

*Primary Examiner*—Agustin Bello
(74) *Attorney, Agent, or Firm*—Sentry Law Group; Steven P. Wigmore

(57) ABSTRACT

The present invention is generally drawn to optical network architecture that can include a multi-subscriber optical interface that can service a plurality of subscribers that are located in close proximity relative to one another. For example, the multi-subscriber optical interface can service multiple dwelling units such as an apartment complex that has many different subscribers to the optical network system. Further, the invention can also service subscribers over the same optical waveguide who may have different bandwidth needs, such as businesses, personal/home users and the like.

19 Claims, 20 Drawing Sheets

U.S. PATENT DOCUMENTS

| Patent No. | Kind | Date | Inventor | Ref |
|---|---|---|---|---|
| 4,945,541 | A | 7/1990 | Nakayama | |
| 4,956,863 | A | 9/1990 | Goss | |
| 4,975,899 | A * | 12/1990 | Faulkner | 398/66 |
| 5,029,333 | A * | 7/1991 | Graves et al. | 370/490 |
| 5,099,471 | A * | 3/1992 | Tsukada et al. | 398/98 |
| 5,105,336 | A | 4/1992 | Jacoby et al. | |
| 5,121,240 | A * | 6/1992 | Acampora | 398/101 |
| 5,132,992 | A | 7/1992 | Yurt et al. | |
| 5,144,267 | A * | 9/1992 | West, Jr. | 333/28 R |
| 5,179,591 | A | 1/1993 | Hardy et al. | |
| 5,189,725 | A | 2/1993 | Bensel, III et al. | |
| 5,247,347 | A | 9/1993 | Litteral et al. | |
| 5,249,194 | A | 9/1993 | Sakanushi | |
| 5,253,250 | A | 10/1993 | Schlafer et al. | |
| 5,253,275 | A | 10/1993 | Yurt et al. | |
| 5,301,050 | A * | 4/1994 | Czerwiec et al. | 398/30 |
| 5,303,295 | A * | 4/1994 | West et al. | 380/208 |
| 5,313,546 | A | 5/1994 | Toffetti | |
| 5,325,223 | A | 6/1994 | Bears | |
| 5,345,504 | A | 9/1994 | West, Jr. | |
| 5,349,457 | A | 9/1994 | Bears | |
| 5,365,585 | A | 11/1994 | Puhl et al. | |
| 5,365,588 | A | 11/1994 | Bianco et al. | |
| 5,378,174 | A | 1/1995 | Brownlie et al. | |
| 5,402,315 | A | 3/1995 | Reichle | |
| 5,412,498 | A | 5/1995 | Arstein et al. | |
| 5,432,875 | A | 7/1995 | Korkowski et al. | |
| 5,469,507 | A | 11/1995 | Canetti et al. | |
| 5,495,549 | A | 2/1996 | Schneider et al. | |
| 5,509,099 | A | 4/1996 | Hermsen et al. | |
| 5,510,921 | A * | 4/1996 | Takai et al. | 398/79 |
| 5,517,346 | A * | 5/1996 | Eckstein et al. | 398/161 |
| 5,528,455 | A | 6/1996 | Miles | |
| 5,528,582 | A | 6/1996 | Bodeep et al. | |
| 5,534,912 | A | 7/1996 | Kostreski | |
| 5,541,917 | A * | 7/1996 | Farris | 370/352 |
| 5,550,863 | A | 8/1996 | Yurt et al. | |
| 5,557,317 | A * | 9/1996 | Nishio et al. | 725/92 |
| 5,559,858 | A | 9/1996 | Beveridge | |
| 5,566,099 | A | 10/1996 | Shimada | |
| 5,572,347 | A * | 11/1996 | Burton et al. | 398/71 |
| 5,572,348 | A | 11/1996 | Carlson et al. | |
| 5,572,349 | A | 11/1996 | Hale et al. | |
| 5,574,586 | A * | 11/1996 | Chu et al. | 398/53 |
| 5,666,487 | A | 9/1997 | Goodman et al. | |
| 5,687,014 | A * | 11/1997 | Czerwiec et al. | 398/75 |
| 5,694,232 | A | 12/1997 | Parsay et al. | |
| 5,701,186 | A | 12/1997 | Huber | |
| 5,703,706 | A * | 12/1997 | Eckstein et al. | 398/80 |
| 5,706,303 | A | 1/1998 | Lawrence | |
| 5,715,020 | A | 2/1998 | Kuroiwa et al. | |
| 5,731,546 | A | 3/1998 | Miles et al. | |
| RE35,774 | E | 4/1998 | Moura et al. | |
| 5,767,895 | A * | 6/1998 | Yashiro et al. | 725/106 |
| 5,769,159 | A | 6/1998 | Yun | |
| 5,778,017 | A | 7/1998 | Sato et al. | |
| 5,781,320 | A * | 7/1998 | Byers | 398/56 |
| 5,786,918 | A * | 7/1998 | Suzuki et al. | 398/98 |
| 5,790,523 | A | 8/1998 | Ritchie, Jr. et al. | |
| 5,793,413 | A | 8/1998 | Hylton et al. | |
| 5,793,506 | A * | 8/1998 | Schmid | 398/72 |
| 5,799,088 | A | 8/1998 | Raike | |
| 5,802,089 | A | 9/1998 | Link | |
| 5,815,295 | A * | 9/1998 | Darcie et al. | 398/72 |
| 5,822,102 | A | 10/1998 | Bodeep et al. | |
| 5,841,560 | A * | 11/1998 | Prucnal | 398/101 |
| 5,861,966 | A | 1/1999 | Ortel | |
| 5,867,485 | A | 2/1999 | Chambers et al. | |
| 5,875,430 | A | 2/1999 | Koether | |
| 5,880,864 | A * | 3/1999 | Williams et al. | 398/71 |
| 5,892,865 | A | 4/1999 | Williams | |
| 5,926,297 | A * | 7/1999 | Ishikawa et al. | 398/43 |
| 5,926,303 | A * | 7/1999 | Giebel et al. | 398/117 |
| 5,953,690 | A | 9/1999 | Lemon et al. | |
| 5,969,836 | A | 10/1999 | Foltzer | |
| 5,974,063 | A | 10/1999 | Yoshida | |
| 6,002,692 | A | 12/1999 | Wills | |
| 6,002,720 | A | 12/1999 | Yurt et al. | |
| 6,041,056 | A * | 3/2000 | Bigham et al. | 370/395.64 |
| 6,097,159 | A | 8/2000 | Mogi et al. | |
| 6,097,515 | A * | 8/2000 | Pomp et al. | 398/45 |
| 6,144,702 | A | 11/2000 | Yurt et al. | |
| 6,151,343 | A | 11/2000 | Jurgensen | |
| 6,167,553 | A | 12/2000 | Dent | |
| 6,198,558 | B1 * | 3/2001 | Graves et al. | 398/135 |
| RE37,125 | E | 4/2001 | Carlson et al. | |
| 6,215,939 | B1 | 4/2001 | Cloud | |
| 6,229,701 | B1 | 5/2001 | Kung et al. | |
| 6,229,788 | B1 * | 5/2001 | Graves et al. | 370/230 |
| 6,295,148 | B1 | 9/2001 | Atlas | |
| 6,300,562 | B1 | 10/2001 | Daoud | |
| 6,330,155 | B1 | 12/2001 | Remsburg | |
| 6,336,201 | B1 | 1/2002 | Geile et al. | |
| 6,342,004 | B1 | 1/2002 | Lattimore et al. | |
| 6,356,369 | B1 | 3/2002 | Farhan | |
| 6,360,320 | B1 | 3/2002 | Ishiguro et al. | |
| 6,362,908 | B1 * | 3/2002 | Kimbrough et al. | 398/164 |
| 6,385,366 | B1 | 5/2002 | Lin | |
| 6,421,150 | B2 | 7/2002 | Graves et al. | |
| 6,424,656 | B1 | 7/2002 | Hoebeke | |
| 6,427,035 | B1 | 7/2002 | Mahony | |
| 6,449,408 | B1 * | 9/2002 | Evans et al. | 385/27 |
| 6,452,714 | B1 | 9/2002 | Rollins | |
| 6,457,178 | B1 * | 9/2002 | Slim | 725/127 |
| 6,460,182 | B1 | 10/2002 | BuAbbud | |
| 6,463,068 | B1 | 10/2002 | Lin et al. | |
| 6,483,635 | B1 | 11/2002 | Wach | |
| 6,486,907 | B1 | 11/2002 | Farber et al. | |
| 6,490,727 | B1 | 12/2002 | Nazarathy et al. | |
| 6,493,335 | B1 * | 12/2002 | Darcie et al. | 370/344 |
| 6,496,641 | B1 | 12/2002 | Mahony | |
| 6,507,494 | B1 | 1/2003 | Hutchison | |
| 6,529,301 | B1 | 3/2003 | Wang | |
| 6,546,014 | B1 | 4/2003 | Kramer et al. | |
| 6,577,414 | B1 * | 6/2003 | Feldman et al. | 398/43 |
| 6,611,522 | B1 | 8/2003 | Zheng et al. | |
| 6,621,975 | B2 | 9/2003 | Laporte et al. | |
| 6,654,565 | B2 | 11/2003 | Kenny | |
| 6,674,967 | B2 | 1/2004 | Skrobko et al. | |
| 6,680,948 | B1 | 1/2004 | Majd et al. | |
| 6,682,010 | B2 | 1/2004 | Pohl | |
| 6,687,376 | B1 | 2/2004 | Yamaguchi | |
| 6,687,432 | B2 | 2/2004 | Schemmann et al. | |
| 6,707,024 | B2 | 3/2004 | Miyamoto | |
| 6,738,983 | B1 | 5/2004 | Rao et al. | |
| 6,740,861 | B2 | 5/2004 | Matsuda | |
| 6,771,614 | B1 | 8/2004 | Jones, IV et al. | |
| 6,775,137 | B2 | 8/2004 | Chu et al. | |
| 6,778,785 | B2 | 8/2004 | Imajo | |
| 6,804,256 | B2 | 10/2004 | Chang | |
| 6,804,354 | B1 | 10/2004 | Driscoll | |
| 6,807,188 | B1 * | 10/2004 | Blahut et al. | 370/442 |
| 6,814,328 | B1 | 11/2004 | Li et al. | |
| 6,823,141 | B2 * | 11/2004 | Miyauchi et al. | 398/147 |
| 6,823,385 | B2 | 11/2004 | McKinnon, III et al. | |
| 6,889,007 | B1 | 5/2005 | Wang et al. | |
| 6,895,023 | B2 * | 5/2005 | Fice et al. | 370/509 |
| 6,912,075 | B1 | 6/2005 | Ionov et al. | |
| 6,961,956 | B2 | 11/2005 | Bontempi | |
| 6,973,271 | B2 | 12/2005 | Farmer et al. | |
| 6,978,091 | B1 * | 12/2005 | Needle | 398/72 |
| 7,007,297 | B1 | 2/2006 | Woodward | |
| 7,023,871 | B2 | 4/2006 | Lind et al. | |
| 7,043,164 | B1 * | 5/2006 | Cotter | 398/175 |

| | | | |
|---|---|---|---|
| 7,062,171 B2 * | 6/2006 | Ota et al. | 398/67 |
| 7,190,901 B2 | 3/2007 | Farmer et al. | |
| 7,190,903 B1 * | 3/2007 | Combs et al. | 398/71 |
| 7,218,855 B2 * | 5/2007 | Whittlesey et al. | 398/72 |
| 7,222,358 B2 | 5/2007 | Levinson et al. | |
| 7,227,871 B2 | 6/2007 | Dworkin et al. | |
| 7,242,694 B2 | 7/2007 | Beser | |
| 7,277,637 B2 * | 10/2007 | Jette et al. | 398/70 |
| 7,283,749 B1 * | 10/2007 | Combs et al. | 398/72 |
| 2001/0002195 A1 | 5/2001 | Fellman et al. | |
| 2001/0002196 A1 | 5/2001 | Fellman et al. | |
| 2001/0002486 A1 | 5/2001 | Kocher et al. | |
| 2001/0004362 A1 | 6/2001 | Kamiya | |
| 2001/0030785 A1 * | 10/2001 | Pangrac et al. | 359/125 |
| 2002/0006197 A1 | 1/2002 | Carroll et al. | |
| 2002/0012138 A1 | 1/2002 | Graves et al. | |
| 2002/0021465 A1 | 2/2002 | Moore, Jr. et al. | |
| 2002/0027928 A1 | 3/2002 | Fang | |
| 2002/0039218 A1 | 4/2002 | Farmer et al. | |
| 2002/0063924 A1 * | 5/2002 | Kimbrough et al. | 359/125 |
| 2002/0089725 A1 | 7/2002 | Farmer et al. | |
| 2002/0105965 A1 | 8/2002 | Dravida et al. | |
| 2002/0106178 A1 | 8/2002 | Bumgarner et al. | |
| 2002/0116719 A1 * | 8/2002 | Dapper et al. | 725/116 |
| 2002/0135843 A1 | 9/2002 | Gruia | |
| 2002/0141159 A1 | 10/2002 | Bloemen | |
| 2002/0164026 A1 | 11/2002 | Huima | |
| 2002/0181925 A1 | 12/2002 | Hodge et al. | |
| 2003/0007210 A1 | 1/2003 | Kenny | |
| 2003/0007220 A1 | 1/2003 | Whittlesey et al. | |
| 2003/0011849 A1 | 1/2003 | Farmer et al. | |
| 2003/0016692 A1 | 1/2003 | Thomas et al. | |
| 2003/0072059 A1 | 4/2003 | Thomas et al. | |
| 2003/0086140 A1 | 5/2003 | Thomas et al. | |
| 2003/0090320 A1 | 5/2003 | Skrobko et al. | |
| 2003/0128983 A1 * | 7/2003 | BuAbbud et al. | 398/71 |
| 2003/0154282 A1 | 8/2003 | Horvitz | |
| 2003/0189587 A1 | 10/2003 | White et al. | |
| 2003/0194241 A1 | 10/2003 | Farmer | |
| 2003/0206564 A1 | 11/2003 | Mills et al. | |
| 2003/0206634 A1 | 11/2003 | Rose | |
| 2003/0223750 A1 | 12/2003 | Farmer et al. | |
| 2004/0086277 A1 | 5/2004 | Kenny | |
| 2004/0131357 A1 | 7/2004 | Farmer et al. | |
| 2004/0141747 A1 | 7/2004 | Kenny et al. | |
| 2004/0161217 A1 | 8/2004 | Hodge et al. | |
| 2004/0199502 A1 | 10/2004 | Wong et al. | |
| 2004/0221088 A1 | 11/2004 | Lisitsa et al. | |
| 2004/0253003 A1 | 12/2004 | Farmer et al. | |
| 2004/0264492 A1 | 12/2004 | Blahut | |
| 2004/0264964 A1 * | 12/2004 | BuAbbud | 398/72 |
| 2004/0267730 A1 | 12/2004 | Dumais et al. | |
| 2005/0053350 A1 | 3/2005 | Hodge et al. | |
| 2005/0074241 A1 | 4/2005 | Farmer et al. | |
| 2005/0081244 A1 | 4/2005 | Barrett et al. | |
| 2005/0123001 A1 | 6/2005 | Craven et al. | |
| 2005/0125837 A1 | 6/2005 | Farmer et al. | |
| 2005/0175035 A1 | 8/2005 | Neely et al. | |
| 2006/0020975 A1 | 1/2006 | Kenny et al. | |
| 2006/0039699 A1 | 2/2006 | Farmer et al. | |
| 2006/0075428 A1 | 4/2006 | Farmer et al. | |
| 2006/0165413 A1 * | 7/2006 | Schemmann et al. | 398/71 |
| 2007/0076717 A1 | 4/2007 | Limb et al. | |

FOREIGN PATENT DOCUMENTS

| | | |
|---|---|---|
| EP | 0713347 A2 | 5/1996 |
| EP | 0720322 A2 | 7/1996 |
| EP | 0 566 662 | 11/1999 |
| EP | 0955739 A2 | 11/1999 |
| EP | 0 933 892 | 10/2003 |
| JP | 07-020327 | 1/1995 |
| JP | 10-020123 | 1/1998 |
| JP | 11-305052 | 11/1999 |
| JP | 4-504433 | 3/2002 |
| MX | 180038 | 11/1995 |
| TW | 72821 | 8/1995 |
| WO | WO 01/27940 A2 | 4/2001 |
| WO | WO 02/30019 A3 | 4/2002 |
| WO | WO 02/30020 A2 | 4/2002 |
| WO | WO 02/060123 A2 | 8/2002 |
| WO | WO 03/001737 | 1/2003 |
| WO | WO 03/005611 | 1/2003 |
| WO | WO 03/005612 | 1/2003 |
| WO | WO 03/019243 | 3/2003 |
| WO | WO 03/021820 | 3/2003 |
| WO | WO 03/023980 | 3/2003 |
| WO | WO 03/079567 | 9/2003 |
| WO | WO 03/090396 | 10/2003 |
| WO | WO 2006/014433 | 2/2006 |
| WO | WO 2006/020538 | 2/2006 |
| WO | WO 2006/041784 | 4/2006 |

OTHER PUBLICATIONS

International Search Report dated Apr. 22, 2003 for PCT/US01/50361.

L. Zhang et al., "Label-switching architecture for IP traffic over WDM networks", IEE Proc.-Commun., vol. 147, No. 5, Oct. 2000, pp. 269-275.

J. Masip-Torné, et al., "Providing Differentiated Service Categories in Optical Packet Networks", Proceedings of the International Teletraffic Congress. ITC-16. Teletraffic Engineering in a Competitive World. Edinburgh, UK, Jun. 7-11, 1999, Teletraffic Science and Engineering, Amsterdam: Elsevier, NL, vol. 3B, Jun. 7, 1999, pp. 1115-1126.

J. Bannister et al., "How Many Wavelengths Do We Really Need? A Study of the Performance Limits of Packet Over WaveLengths", Optical Networks Magazin, SPIE, Bellingham, WA, vol. 1, No. 2, Apr. 2000, pp. 17-28.

O. W.W. Yang, et al. , "All-Optical WDM/TDM Star-Bus Network Using Optical Amplifiers", Journal of Optical Communications, Fachverlage Schiele & Schon. Berlin, DE, vol. 16, No. 6, Dec. 6, 1995, pp. 216-226.

Walter Ciciora et al., "Modern Cable Television Technology: Video, Voice, and Data Communications", © 1999 by Morgan Kaufman Publishers, Inc., pp. 167-176.

International Search Report dated Apr. 21, 2003 for PCT/US02/28734.

Written Opinion dated May 6, 2003 for PCT/US01/21298.

Global Access™, Universal Services Gateway, USG100, ARRIS, pp. 1-2, Oct. 18, 2002.

Global Access™, Universal Access Switch, UAS4024, ARRIS, pp. 1-2, Aug. 28, 2002.

International Search Report dated Dec. 4, 2002 for PCT/US02/27398.

"Digital Broadband Delivery System: Out of Band Transport—Mode A," Society of Cable Telecommunications Engineers, Inc., Aug. 26, 1998, 49 pgs.

B. Gaglianello & P. Thompson, "An Efficient MAC Layer Protocol for EPON," IEEE 802.3 EFM Nov. 2001, 9 pgs.

"Cisco IOS™ Software Quality of Service Solutions," Cisco Systems, Inc. 1998, 28 pgs.

International Search Report for PCT/US01/21298, 2 pgs , mailed Jun. 17, 2002.

International Search Report for PCT/US02/03056, 1 pg, mailed Jun. 12, 2002.

"Ethernet—Accelerating the Standard for Speed," 7 pgs, Gigabit Ethernet Alliance, Nov. 2000 at www.gigabit-ethernet.org.

"eLuminant—Asynchronous Transfer Mode (ATM) Passive Optical Networks (PONS) Tutorial" 28 pgs, the International Engineering Consortium, 2000 at www.iec.org.

International Search Report dated Dec. 17, 2002 for PCT/US02/15861.

"Trading Update and Operational Review Presentation" Marconi, Sep. 4, 2001, pp. 1-35.

"Cable Market" 2 pgs, Marconi Corporation, PLC, 2000 at www.Marconi.com.
"Communications" 2 pgs, Marconi Corporation, PLC, 2000 at www.Marconi.com.
"Dalton Utilities" 9 pgs, Marconi Corporation, PLC, 2002 at www.Marconi.com.
"Deep Fiber Solutions" 3 pgs, Marconi Corporation, PLC, 2000 at www.Marconi.com.
"Deep Fiber HFC Features and Benefits" 1 pg, Marconi Corporation, PLC, 2002 at www.Marconi.com.
"Deep Fiber HFC Network Diagram" 1 pg, Marconi Corporation, PLC, 2002 at www.Marconi.com.
"Deep Fiber HFC Product Overview: New FITL Configuration" 2 pgs, Marconi Corporation, PLC, 2002 at www.Marconi.com.
"Deep Fiber HFC Technical Specifications" 2 pgs; Marconi Corporation, PLC, 2002 at www.Marconi.com.
"Deep Fiber HFC—New FITL Configuration" 1 pg, Marconi Corporation, PLC, 2002 at www.Marconi.com.
"En-Touch" at 5 pgs, Marconi Corporation, PLC, 2002 www.Marconi.com.
"Deep Fiber HFC" Marconi Corporation PLC 2000, pp. 1-2.
"Integrated Voice, Video and Data Services Over a Single Fiber: A Compelling Opportunity for Cable Operators" Marconi Corporation PLC, May 2000, 6 pgs.
"Deep Fiber Solutions: Advanced Broadband Services" Marconi Corporation PLC, May 2000, 5pgs.
"Deep Fiber HFC: A Next-Generation Integrated Access Solution Offering Significant Improvement Over Traditional HFC Architectures" Marconi Corporation PLC, May 2000, 8pgs.
"A Gold Mine of Opportunities in the Face of Increasing Competition: Choices for Utilities Entering the Communications Marketplace" Marconi Corporation PLC, May 2000, 6pgs.
"Fiber Optics on New Development MDUs: A Research Summary," Marconi Corporation PLC, May 2000, 5pgs.
"Thermal Management Challenges: Small ONU Enclosures," Marconi Corporation PLC, May 2000, 9pgs.
"Passive Optical Networks—Is There Light at the End of the Access Tunnel?" CIBC World Markets Inc., Jan. 11, 2001, pp. 1-66.
"36.2.4 8B/10B transmission code", IEEE 2000, pp. 966-969.
G. Khoe et al., "Coherent Multicarrier Technology for Implementation in the Customer Access," IEEE, May/Jun. 1993, pp. 695-713.
L. Linnell, "A Wide-Band Local Access System Using Emerging-Technology Components," IEEE, Jul. 1986, pp. 612-618.
"Digital Broadband Delivery System: Out of Band Transport—Mode B," Society of Cable Telecommunications Engineers, Inc., Aug. 10, 1998, 76 pgs.
Bourne, John et al., "Heathrow—Experience and Evolution" IEEE, 1990, pp. 1091-1095.
Miki, Tetsuya et al., "A Design Concept on Fiber-Optic Wavelength-Division-Multiplexing Subscriber Loop System" WTG—Fachber, 1980, pp. 41-45.
Yamaguchi, K. et al., "A Broadband Access Network Based on Optical Signal Processing: The Photonic Highway" IEEE, 1990, pp. 1030-1037.
International Search Report of Jul. 7, 2003 for PCT/US01/51350.
Angelopoulos, J.D. et al., "A Transport Mac Method for Bandwidth Sharing and CDV Control at the ATM Layer of Passive Optical Networks" Journal of Lightwave Technology, IEEE, 1996, pp. 2625-2634.
International Search Report of Jul. 2, 2003 for PCT/US03/07814.
International Search Report of Oct. 3, 2003 for PCT/US03/1223I.
Ciciora, Walter S. et al., "Modern Cable Television Technology: Video, Voice, and Data Communications", © 1999, pp. 162-214, Chapter 4, Morgan Kaufmann Publishers, Inc., San Francisco, California.
Glaesemann, G. Scott et al., "The Mechanical Reliability of Corning® Optical Fiber in Bending White Paper", Sep. 2002, pp. 1-4.
Corning® SMF-28™ Optical Fiber Product Information, "Corning® Single-Mode Optical Fiber", Apr. 2002, pp. 1-4.
CEDaily Direct News, "Today's Report", Mar. 19, 2001, pp. 1-5.
Lucent Technologies, "Lucent Technologies Introduces Single-Fiber Network Access Devices for Voice, Video, and Data Services to the Home or Curb", Jun. 6, 2000, pp. 1-2.
Lucent Technologies, "Agere Systems Introduces Single-Fiber Network Access Devices for Voice, Video and Data Services to the Home or Curb", Mar. 19, 2001, pp. 1-3.
Optical Networks Daily, a Publication of Optical Keyhole, Aug. 26, 2003, pp. 1-13.
McDevitt et al., Switched vs Broadcast Video for Fiber-to-the Home Systems, Alcatel Network Systems, 1990, IEEE, CH2829-0/90/0000-1109, pp. 1109-1119.
Mangun et al., Fiber to the Home Experience in Southern Bell, BellSouth Services and Northern Telecom, 1988, IEEE, CH2536-1/88/0000-0208, pp. 208-212.
Han et al., Burst-Mode Penalty of AC- Coupled Optical Receivers Optimized for 8B/10B Line Code, 2004, IEEE.
Coppinger et al., Nonlinear Raman Cross-Talk in a Video Overlay Passive Optical Network, 2003, Tuesday Afternoon, OFC 2003, vol. 1, pp. 285-286.
Piehler et al., Nonlinear Raman Crosstalk in a 125-Mb/s CWDM Overlay on a 1310-nm Video Access Network, 2003, Optical Society of America.
Wong et al., 50-dB Nonlinear Crosstalk Suppression in a WDM Analog Fiber System by Complementary Modulation and Balanced Detection, 2003, IEEE, pp. 500-505.
Perkins, The Art of Overlaying Video Services on a BPON, 2004, Bechtel Corporation, pp. 1-9.
Effenberger et al., "G.983.VideoReturnPath." Oct. 2004, International Telecommunication Union, Telecommunication Standardization Sector, Study Group 15—Contribution 13, pp. 1-18.
Fludger et al., "Pump to Signal RIN Transfer in Raman Fiber Amplifiers", Journal of Lightwave Technology, IEEE, New York, US, vol. 19, No. 8, Dec. Aug. 2001, pp. 1140-1148, ISSN: 0733-8724.
"Spectral Grids for WDM Applications: CWDM Wavelength Grid", International Telecommunication Union, ITU-T, Rec. G.694.2, Dec. 2003. pp. i-iii and pp. 1-4.
International Preliminary Examination Report of Nov. 19, 2003 for PCT/US03/07814.
International Preliminary Report on Patentability of Apr. 1, 2005 for PCT/US01/51350.
International Preliminary Examination Report of Sep. 17, 2004 for PCT/US03/12231.
International Search Report dated Apr. 18, 2006 for PCT/US05/23847.
Tian et al., Raman Crosstalk in Fiber-Optic Hybrid CATV Systems with Wide Channel Separations, *IEEE Photonics Technology Letters*, vol./Iss: 16(1), pp. 344-346, Jan. 1, 2004.
PCT International Search Report—PCT/US01/50361, pp. 1-3, Apr. 22, 2003.
PCT International Search Report—PCT/US05/28020, p. 1, Nov. 8, 2006.
PCT International Search Report—PCT/US05/46419, p. 1, Feb. 14, 2007.
PCT International Search Report—PCT/US006/11159, p. 1, Feb. 21, 2007.
PCT International Search Report—PCT/US05/35512, p. 1, Oct. 25, 2006.
Bourne et al., Heathrow—Experience and Evolution, *IEEE*, pp. 1091-1095, Jan. 1, 1990.
PCT International Search Report—PCT/US06/11159, p. 1, Feb. 21, 2007.
ITC-16. Teletraffic Engineering in a Competitive World, *Teletraffic Science and Engineering*, pp. 1115-1126, Jun. 7, 1999.

* cited by examiner

Data Service Hub
110

Laser Transceiver Node 120A

Data Service Hub
110B

Laser Transceiver Node 120B

Laser Transceiver Node 120C

Data Service Hub 110D

Laser Transceiver Node 120D

Laser Transceiver Node 120E

Laser Transceiver Node 120F

SYSTEM AND METHOD FOR COMMUNICATING OPTICAL SIGNALS TO MULTIPLE SUBSCRIBERS HAVING VARIOUS BANDWIDTH DEMANDS CONNECTED TO THE SAME OPTICAL WAVEGUIDE

STATEMENT REGARDING PRIORITY AND RELATED APPLICATIONS

This application is a continuation of and claims priority to application Ser. No. 10/151,490 filed May 20, 2002 now U.S. Pat. No 7,218,855, entitled "System and Method for Communicating Optical Signals to Multiple Subscribers Having Various Bandwidth Demands Connected to the Same Optical Waveguide," the entire contents of which are incorporated by reference.

TECHNICAL FIELD

The present invention relates to video, voice, and data communications. More particularly, the present invention relates to a fiber-to-the-curb (FTTC) system that is capable of supporting several different subscribers having various degrees or levels of bandwidth on the same optical waveguide.

BACKGROUND OF THE INVENTION

The increasing reliance on communication networks to transmit more complex data, such as voice and video traffic, is causing a very high demand for bandwidth. To resolve this demand for bandwidth, communication networks are relying more upon optical fibers to transmit this complex data. Conventional communication architectures that employ coaxial cables are slowly being replaced with communication networks that comprise only fiber optic cables. One advantage that optical fibers have over coaxial cables is that a much greater amount of information can be carried on an optical fiber.

While carrying a greater amount of information is a tremendous advantage for optical fibers, this advantage does come with a price: sophisticated optical network architectures. One problem faced by many conventional optical network architectures is servicing subscribers that have various degrees or levels of demand for bandwidth. For example, in a conventional optical network architecture, if a home or personal use based subscriber is located adjacent to a business subscriber who has a greater need for bandwidth, conventional optical network architectures will provide the home subscriber with and business subscriber with different fiber optic cables. In other words, each subscriber in this scenario will be provided with its own separate fiber optic cable.

Such conventional optical network architectures using separate fiber optic cables for each customer because of bandwidth concerns adds to the complexity as well as the cost of such a system since separate hardware and software components are usually required to service two different fiber optic cables.

Unrelated to the multiple service/multiple bandwidth problems faced by many conventional optical network architectures, another problem faced by optical network architectures is the attenuation of video service signals. Specifically, when analog video optical signals are converted to the electrical domain for propagation over a coaxial cable, the higher frequencies of the video service signal typically loose signal strength faster than lower frequencies as the signals are propagated thorough the cable.

In order to compensate for this phenomenon, conventional optical network architectures sometimes place a tilt network at fiber optic nodes and RF amplifiers in their plant. Alternatively, some conventional optical network architectures increase the magnitude of their video signal strength at the head-end in order to overcompensate for this attenuation of high frequencies for the video service signal over the coaxial cables proximate to the subscribers. Placing a tilt network at the head-end can cause problems for individual subscribers such as personal or home use subscribers, since coaxial cables interfacing with an optical network typically have a relatively short length.

Another problem faced by conventional optical network architectures is servicing conventional set top terminals that require a return RF path to the head-end. A conventional RF return path typically comprises two-way RF distribution amplifiers with coaxial cables and two-way fiber optic nodes being used to interface with fiber optic cables. A pair of fiber optic strands can be used to carry the radio frequency signals between the head-end and node in an analog optical format. Each optical cable of the pair of fiber optic strands carries analog RF signals: one carries analog RF signals in the downstream direction (toward the subscriber) while the other fiber optic cable carries analog RF signals in the reverse or upstream direction (from the subscriber). In a more recent embodiment, the upstream spectrum (typically 5-42 MHz in North America) is digitized at the node. The digital signals are transmitted to the headend, where they are converted back to the analog RF spectrum of 5-42 MHz. This process typically uses high data rates (at least 1.25 Gb/s) and a fiber or wavelength dedicated to return traffic from one or two nodes.

Conventional optical network architectures typically do not comprise a return RF path from the subscriber to the data service hub because most of the return paths comprise only fiber optic cables that propagate digital data signals as opposed to analog RF signals. In conventional fiber-to-the-home (FTTH) and fiber-to-the-curb (FTTC) systems, a downstream RF path is usually provided because it is needed for the delivery of television programs that use conventional broadcast signals. This downstream RF path can support RF modulated analog and digital signals as well as RF modulated control signals for any set top terminals that may be used by the subscriber. However, as noted above, conventional FTTH systems do not provide for any capability of supporting a return RF path for RF analog signals generated by a legacy set top terminal.

Accordingly, in light of the problems identified above, there is a need in the art for a method and system for communicating optical signals to multiple subscribers having various bandwidth demands on a single optical waveguide. In other words, there is a need in the art for an optical network architecture that can service multiple subscribers along the same optical waveguide irrespective of the demand for bandwidth imposed by each subscriber of the network. Another need exists in the art for an optical network architecture that provides a central service disconnection point for a plurality of subscribers in a centralized location.

There is a further need in the art for positioning tilt networks in a centralized location outside a data service hub when servicing multiple subscribers of an optical network. A further need exists in the art for a method and system that provides a return path for RF signals that are generated by legacy video service terminals. A further need exists in the art for a method and system for communicating optical signals between a data service provider and subscriber that preserves the functioning of legacy set top converters using RF to communicate upstream to the headend.

Another need exists in the art for an optical network system that lends itself to efficient upgrading that can be performed entirely on the network side. In other words, there is a need in the art for an optical network system that allows upgrade to hardware to take place and locations between and within a data service hub and an active signal source disposed between the data service hub and a subscriber.

An additional need exists in the art for an optical network architecture that can take advantage of relatively inexpensive hardware components that typically service shorter distances than their expensive counterparts that service optical signals over large distances. There is a further need in the art for a system and method that can allocate additional or reduced bandwidth based upon the demand of one or more subscribers on an optical network.

SUMMARY OF THE INVENTION

The present invention is generally drawn to a system and method for efficient propagation of data and broadcast signals over an optical fiber network. More specifically, the present invention is generally drawn to optical network architecture that can include a multi-subscriber optical interface that can service a plurality of subscribers that are located in very close proximity relative to one another. For example, the multi-subscriber optical interface can service multiple dwelling units such as an apartment complex that has many different subscribers of the optical network system.

One inventive aspect of the present invention is that in addition to servicing multiple subscribers that are located in very close proximity relative to one another, the present invention can also service many different types of subscribers with the same multi-subscriber optical interface. That is, the multi-subscriber optical interface can service personal-use subscribers with relatively modest bandwidth demand while servicing businesses that may have relatively high bandwidth demand. For example, a multiple subscriber optical interface can service a personal or home subscriber who desires only a bandwidth of 500 kilobits per second while the multi-subscriber optical interface can also service a business that needs a bandwidth of at least a DS1 level (1.544 Megabits per second).

The multi-subscriber optical interface can be part of an optical network system that also employs single subscriber optical interfaces. In other words, the multi-subscriber optical interface can be combined with a single subscriber optical interfaces that are designed to handle the optical communications for a single subscriber to the network.

According to one exemplary aspect of the present invention, to handle subscriber video services, the multi-subscriber optical interface can comprise an optical diplexer, an analog optical receiver, a tilt network, an amplifier, an RF splitter, and a service disconnect switch. For data services, the multi-subscriber optical interface can comprise the optical diplexer, a bidirectional optical signal splitter, a digital optical receiver, a processor, a tilt network, and a digital optical transmitter.

According to another exemplary aspect, the processor of a multi-subscriber optical interface can comprise a switch, a microcomputer, a digital signal processor, a data router, a subscriber line audio-interface circuit (SLAC), and a subscriber line interface circuit (SLIC). The SLAC and SLIC devices can assist in providing subscriber telephone services while the data router can support data services for each subscriber. With the data router, improved management of individual accounts for each subscriber in of a multi-subscriber optical interface can be achieved.

According to a further exemplary aspect of the present invention, the multi-subscriber optical interface can comprise an RF return path. The RF return path supports RF signals produced by subscribers who interact with the video services being supplied by the multi-subscriber optical interface. The RF return path according to one exemplary embodiment comprises an RF diplexer, an analog-to-digital (A/D) converter, a data reduction circuit, and a time stamp circuit. According to another exemplary aspect, the RF return path can comprise an RF diplexer, an RF presence detector, an electrical to optical converter, and an optical triplexer.

The multi-subscriber optical interface is but one part of the present invention. The present invention also comprises an efficient coupler, referred to as an optical tap, between a laser transceiver node and a respective single or multi-subscriber optical interface. The optical tap can divide optical signals between a plurality of subscribers and can be simple in its design. For example, each optical tap can comprise an optical splitter that may feed one or more subscribers. Optical taps can be cascaded or they can be connected in a star architecture from the laser transceiver node.

The optical tap can also route signals to other optical taps that are downstream relative to a respective optical tap. The optical tap can also connect to a small number of optical waveguides so that high concentrations of optical waveguides are not present at any particular laser transceiver node. In other words, the optical tap can connect to a predetermined number of optical waveguides at a point remote from the laser transceiver node so that high concentrations of optical waveguides at the laser transceiver node can be avoided.

As noted above, the optical tap and laser transceiver node are parts of the present invention. The present invention can include a system that comprises the optical tap, the laser transceiver node, a data service hub, a subscriber optical interface, and optical waveguides connected between the optical taps and laser transceiver node.

DETAILED DESCRIPTION OF EXEMPLARY EMBODIMENTS

Figure 1:
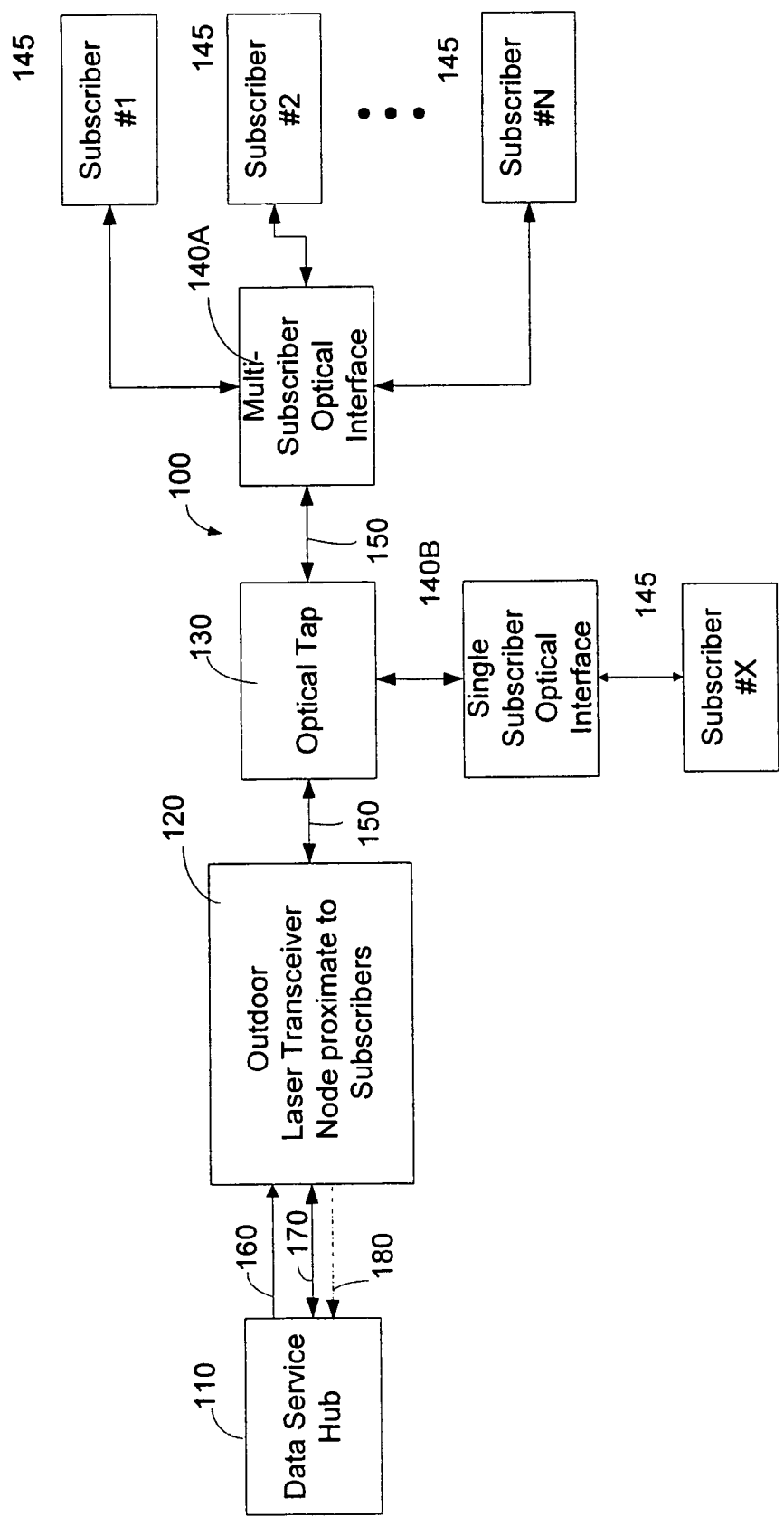
FIG. 1 is a functional block diagram of some core components of an exemplary optical network architecture according to the present invention.

An optical network architecture according to the present invention can include a multi-subscriber optical interface that can service a plurality of subscribers that are located in very close proximity relative to one another. For example, the multi-subscriber optical interface can service multiple dwelling units such as an apartment complex that has many different subscribers of the optical network system. In addition to servicing multiple subscribers that are located in very close proximity relative to one another, the present invention can also service many different types of subscribers with the same multi-subscriber optical interface. That is, the multi-subscriber optical interface can service personal-use subscribers with relatively modest bandwidth demand while servicing businesses that may have relatively high bandwidth demand.

The multi-subscriber optical interface can be part of an optical network system that also employs single subscriber optical interfaces. In other words, the multi-subscriber optical interface can be combined with a single subscriber optical interfaces that are designed to handle the optical communications for a single subscriber to the network.

Referring now to the drawings, in which like numerals represent like elements throughout the several Figures, aspects of the present invention and the illustrative operating environment will be described.

FIG. 1 is a functional block diagram illustrating an exemplary optical network architecture 100 according to the present invention. The exemplary optical network architecture 100 comprises a data service hub 110 that is connected to one or more outdoor laser transceiver nodes 120. The laser transceiver nodes 120, in turn, are connected to an optical taps 130. The optical taps 130 can be connected to a plurality of subscriber optical interfaces 140. Specifically, the optical taps 130 maybe connected to one or more multi-subscriber optical interfaces 140A or single subscriber optical interfaces 140B or a combination thereof. Subscribers 145 can be connected to each of the respective subscriber optical interfaces 140.

Between respective components of the exemplary optical network architecture 100 are optical waveguides such as optical waveguides 150, 160, 170 and 180. The optical waveguides 150-180 are illustrated by arrows with the arrowheads of the arrows illustrating exemplary directions of the data flow between respective components of the illustrative an exemplary optical network 100.

Figure 2:
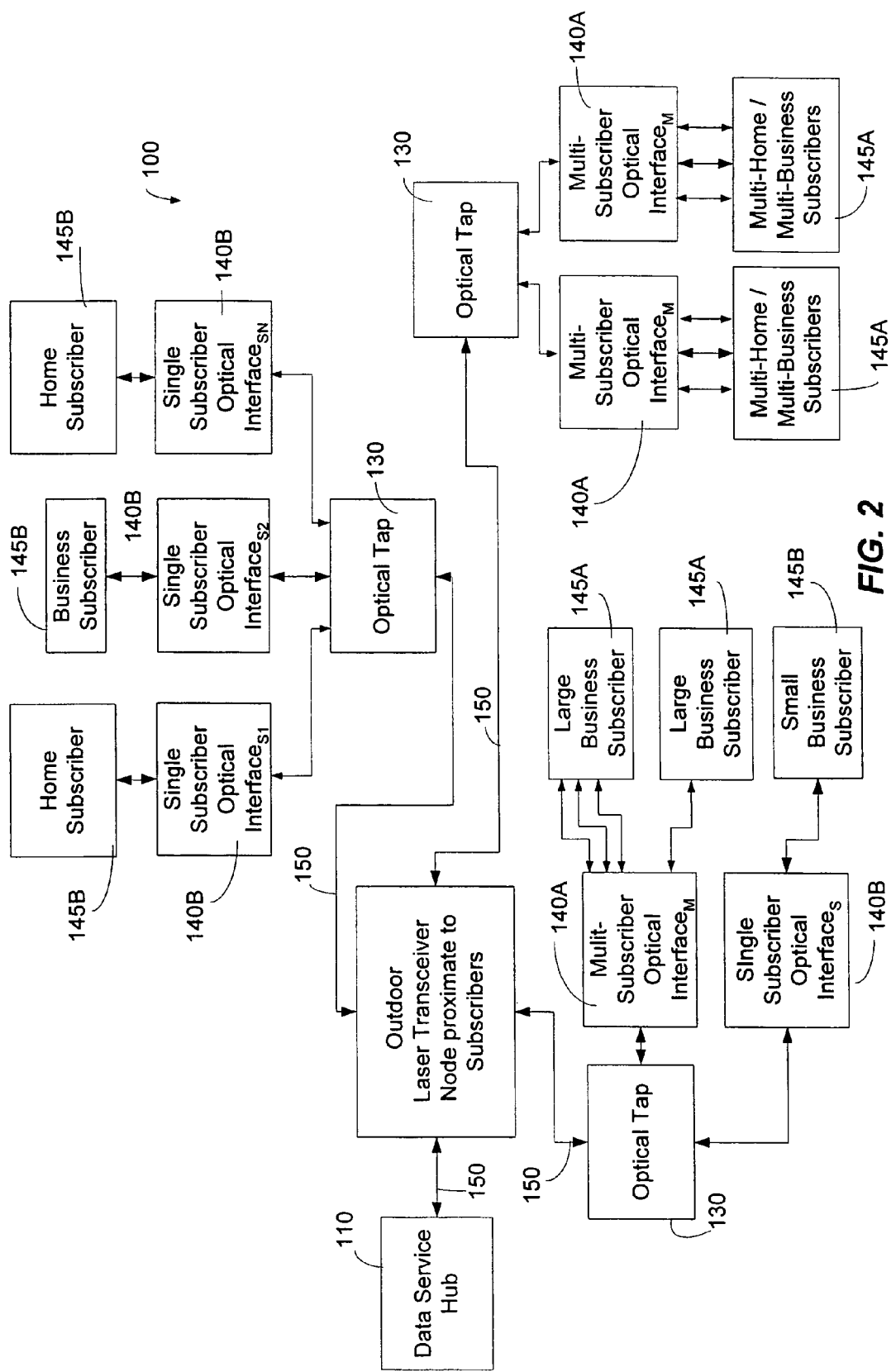
FIG. 2 is a functional block diagram illustrating an exemplary optical network architecture for the present invention.

While only an individual laser transceiver nodes 120, individual optical taps 130, and individual subscriber optical interfaces 140 are illustrated in FIG. 1, as will become apparent from FIG. 2, in its corresponding description, a plurality of laser transceiver nodes 120, optical taps 130, and subscriber optical interfaces 140 can be employed without departing from the scope and spirit of the present invention. Typically, many of the exemplary embodiments of the present invention, multiple subscriber optical interfaces 140 are connected to one or more optical taps 130.

The outdoor laser transceiver node 120 can allocate additional or reduced bandwidth based upon the demand of one or more subscribers that use the subscriber optical interfaces 140. The outdoor laser transceiver node 120 can be designed to withstand outdoor environmental conditions and can be designed to hang on a strand or fit in a pedestal or "hand hole." The outdoor laser transceiver node can operate in a temperature range between minus 40 degrees Celsius to plus 60 degrees Celsius. The laser transceiver node 120 can operate in this temperature range by using passive cooling devices that do not consume power.

In one exemplary embodiment of the present invention, three trunk optical waveguides 160, 170, and 180 (that can comprise optical fibers) can conduct optical signals from the data service hub 110 to the outdoor laser transceiver node 120. It is noted that the term "optical waveguide" used in the present application can apply to optical fibers, planar light guide circuits, and fiber optic pigtails and other like optical waveguides.

A first optical waveguide 160 can carry broadcast video and other signals. The signals can be carried in a traditional cable television format wherein the broadcast signals are modulated onto carriers, which in turn, modulate an optical transmitter (not shown) in the data service hub 110. A second optical waveguide 170 can carry downstream targeted services such as data and telephone services to be delivered to one or more subscriber optical interfaces 140. In addition to carrying subscriber-specific optical signals, the second optical waveguide 170 can also propagate internet protocol broadcast packets, as is understood by those skilled in the art.

In one exemplary embodiment, a third optical waveguide 180 can transport data signals upstream from the outdoor laser transceiver node 120 to the data service hub 110. The optical signals propagated along the third optical waveguide 180 can also comprise data and telephone services received from one or more subscribers. Similar to the second optical waveguide 170, the third optical waveguide 180 can also carry IP broadcast packets, as is understood by those skilled in the art.

The third or upstream optical waveguide 180 is illustrated with dashed lines to indicate that it is merely an option or part of one exemplary embodiment according to the present invention. In other words, the third optical waveguide 180 can be removed. In another exemplary embodiment, the second optical waveguide 170 propagates optical signals in both the upstream and downstream directions as is illustrated by the double arrows depicting the second optical waveguide 170.

In such an exemplary embodiment where the second optical waveguide 170 propagates bidirectional optical signals, only two optical waveguides 160, 170 would be needed to support the optical signals propagating between the data server's hub 110 in the outdoor laser transceiver node 120. In another exemplary embodiment (not shown), a single optical waveguide can be the only link between the data service hub 110 and the laser transceiver node 120. In such a single optical waveguide embodiment, three different wavelengths can be used for the upstream and downstream signals. Alternatively, bi-directional data could be modulated on one wavelength.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140.

In another exemplary embodiment, the optical tap 130 can comprise a 4-way splitter to service four subscriber optical interfaces 140. Yet in another exemplary embodiment, the optical tap 130 can further comprise a 4-way splitter that is also a pass-through tap meaning that a portion of the optical signal received at the optical tap 130 can be extracted to serve the 4-way splitter contained therein while the remaining optical energy is propagated further downstream to another optical tap or another subscriber optical interface 140. The present invention is not limited to 4-way and 8-way optical splitters. Other optical taps having fewer or more than 4-way or 8-way splits are not beyond the scope of the present invention.

Referring now to FIG. 2, this figure is a functional block diagram illustrating an exemplary optical network architecture 100 that includes various types of subscribers 145. Specifically, one type of a subscriber can comprise a large business subscriber or a multi dwelling or multiple business subscribers 145A. Another type of subscriber can comprise a home or personal-use or small business subscriber 145B. The terms "large" and "small" are defined relative to the amount of bandwidth needed or demanded by a particular subscriber 145.

Each optical tap 130 can comprise an optical splitter. The optical tap 130 allows multiple subscriber optical interfaces 140 (such as single subscriber optical interfaces 140B or multiple or multi-subscriber optical interfaces 140A) to be coupled to a single optical waveguide 150 that is connected to the outdoor laser transceiver nodes 120. In one exemplary embodiment, six optical fibers 150 are designed to be connected to the outdoor laser transceiver nodes 120. For the use of optical taps 130, sixteen subscribers can be assigned to each of the six optical waveguides 150 that are connected to the outdoor laser transceiver nodes 120.

In another exemplary embodiment, twelve optical fibers 150 can be connected to the outdoor laser transceiver nodes 120 while eight subscriber optical interfaces 140 are assigned to each of the twelve optical waveguides 150. Those skilled in the art will appreciate the number of subscriber optical interfaces 140 assigned to a particular waveguide 150 that is connected between the outdoor laser transceiver nodes 120 and a subscriber optical interface 140 (by way of the optical tap 130) can be varied or changed without departing from the scope and spirit of the present invention. Further, those skilled in the art recognize that the actual number of subscriber optical interfaces 140 assigned to a particular optical waveguide is dependent upon the amount of power available on a particular optical waveguide 150.

As depicted in FIG. 2, many configurations for supplying communication services to subscribers are possible. Combinations of single subscriber optical interfaces 140B coupled with multiple subscriber optical interfaces 140A along the same the optical waveguide is possible with the present invention. The combinations of optical taps 130 with other optical taps 130 in addition to combinations of optical taps with various types of subscriber optical interfaces 140 are limitless. With the optical taps 130, concentrations of distribution optical waveguide 150 at the laser transceiver nodes 120 can be reduced. Additionally, the total amount of fiber needed to service the subscriber grouping attached to a single subscriber interface 140B or a multi-subscriber optical interface 140A can also be reduced.

With the active laser transceiver node 120 of the present invention, the distance between the laser transceiver node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

Those skilled in the art will appreciate that other configurations of the optical waveguides disposed between the data service hub 110 and outdoor laser transceiver node 120 are not beyond the scope of the present invention. Because of the bi-directional capability of optical waveguides, variations in the number and directional flow of the optical waveguides disposed between the data service hub 110 and the outdoor laser transceiver node 120 can be made without departing from the scope and spirit of the present invention.

Figure 3:
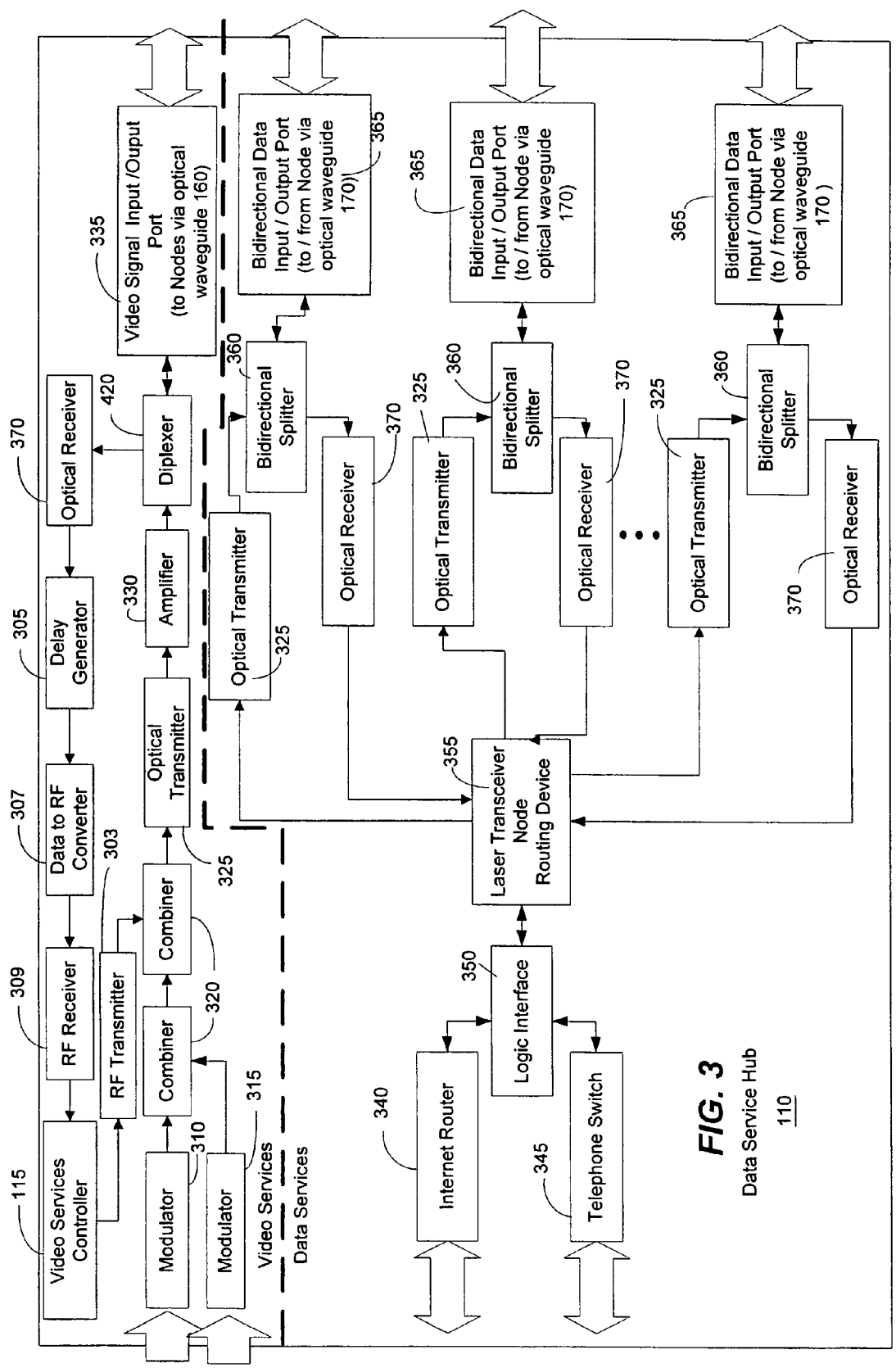
FIG. 3 is a functional block diagram illustrating an exemplary data service hub of the present invention.

Referring now to FIG. 3, this functional block diagram illustrates an exemplary data service hub 110 of the present invention. The exemplary data service hub 110 illustrated in FIG. 3 is designed for a two trunk optical waveguide system. That is, this data service hub 110 of FIG. 3 is designed to send and receive optical signals to and from the outdoor laser transceiver node 120 along the first optical waveguide 160 and the second optical waveguide 170. With this exemplary embodiment, the second optical waveguide 170 supports bi-directional data flow. In this way, the third optical waveguide 180 discussed above is not needed.

The data service hub 110 can comprise one or more modulators 310, 315 that are designed to support television broadcast services. The one or more modulators 310, 315 can be analog or digital type modulators. In one exemplary embodiment, there can be at least 78 modulators present in the data service hub 110. Those skilled in the art will appreciate that the number of modulators 310, 315 can be varied without departing from the scope and spirit of the present invention.

The signals from the modulators 310, 315 are combined in a combiner 320 where they are supplied to an optical transmitter 325 where the radio frequency signals generated by the modulators 310, 315 are converted into optical form.

The optical transmitter 325 can comprise one of Fabry-Perot (F-P) Laser Transmitters, distributed feedback lasers (DFBs), or Vertical Cavity Surface Emitting Lasers (VCSELs). However, other types of optical transmitters are possible and are not beyond the scope of the present invention. With the aforementioned optical transmitters 325, the data service hub 110 lends itself to efficient upgrading by using off-the-shelf hardware to generate optical signals.

The optical signals generated by the optical transmitter (often referred to as the unidirectional optical signals) are propagated to amplifier 330 such as an Erbium Doped Fiber Amplifier (EDFA) where the unidirectional optical signals are amplified. The amplified unidirectional optical signals are then propagated out of the data service hub 110 via a unidirectional signal output port 335 which is connected to one or more first optical waveguides 160.

The unidirectional signal output port 335 is connected to one or more first optical waveguides 160 that support unidirectional optical signals originating from the data service hub 110 to a respective laser transceiver node 120. The data service hub 110 illustrated in FIG. 3 can further comprise an Internet router 340. The data service hub 110 can further comprise a telephone switch 345 that supports telephony service to the subscribers of the optical network system 100. However, other telephony service such as Internet Protocol telephony can be supported by the data service hub 110.

If only Internet Protocol telephony is supported by the data service hub 110, then it is apparent to those skilled in the art that the telephone switch 345 could be eliminated in favor of lower cost Voice over Internet Protocol (VoIP) equipment. For example, in another exemplary embodiment (not shown), the telephone switch 345 could be substituted with other telephone interface devices such as a soft switch and gateway. But if the telephone switch 345 is needed, it may be located remotely from the data service hub 110 and can be connected through any of several conventional means of interconnection.

The data service hub 110 can further comprise a logic interface 350 that is connected to a laser transceiver node routing device 355. The logic interface 350 can comprise a Voice over Internet Protocol (VoIP) gateway when required to support such a service. The laser transceiver node routing device 355 can comprise a conventional router that supports an interface protocol for communicating with one or more laser transceiver nodes 120. This interface protocol can comprise one of gigabit or faster Ethernet or SONET protocols. However, the present invention is not limited to these protocols. Other protocols can be used without departing from the scope and spirit of the present invention.

The logic interface 350 and laser transceiver node routing device 355 can read packet headers originating from the laser transceiver nodes 120 and the internet router 340. The logic interface 350 can also translate interfaces with the telephone switch 345. After reading the packet headers, the logic interface 350 and laser transceiver node routing device 355 can determine where to send the packets of information.

The laser transceiver node routing device 355 can supply downstream data signals to respective optical transmitters 325. The data signals converted by the optical transmitters 325 can then be propagated to a bi-directional splitter 360. The optical signals sent from the optical transmitter 325 into the bi-directional splitter 360 can then be propagated towards a bi-directional data input/output port 365 that is connected to a second optical waveguide 170 that supports bi-directional optical data signals between the data service hub 110 and a respective laser transceiver node 120. Upstream optical signals received from a respective laser transceiver node 120 can be fed into the bi-directional data input/output port 365 where the optical signals are then forwarded to the bidirectional splitter 360.

From the bi-directional splitter 360, respective optical receivers 370 can convert the upstream optical signals into the electrical domain. The upstream electrical signals generated by respective optical receivers 370 are then fed into the laser transceiver node routing device 355. Each optical receiver 370 can comprise one or more photoreceptors or photodiodes that convert optical signals into electrical signals.

When distances between the data service hub 110 and respective laser transceiver nodes 120 are modest, the optical transmitters 325 can propagate optical signals at 1310 nm. But where distances between the data service hub 110 and the laser transceiver node are more extreme, the optical transmitters 325 can propagate the optical signals at wavelengths of 1550 nm with or without appropriate amplification devices.

Those skilled in the art will appreciate that the selection of optical transmitters 325 for each circuit may be optimized for the optical path lengths needed between the data service hub 110 and the outdoor laser transceiver node 120. Further, those skilled in the art will appreciate that the wavelengths discussed are practical but are only illustrative in nature. In some scenarios, it may be possible to use communication windows at 1310 and 1550 nm in different ways without departing from the scope and spirit of the present invention. Further, the present invention is not limited to a 1310 and 1550 nm wavelength regions. Those skilled in the art will appreciate that smaller or larger wavelengths for the optical signals are not beyond the scope and spirit of the present invention.

Figure 4:
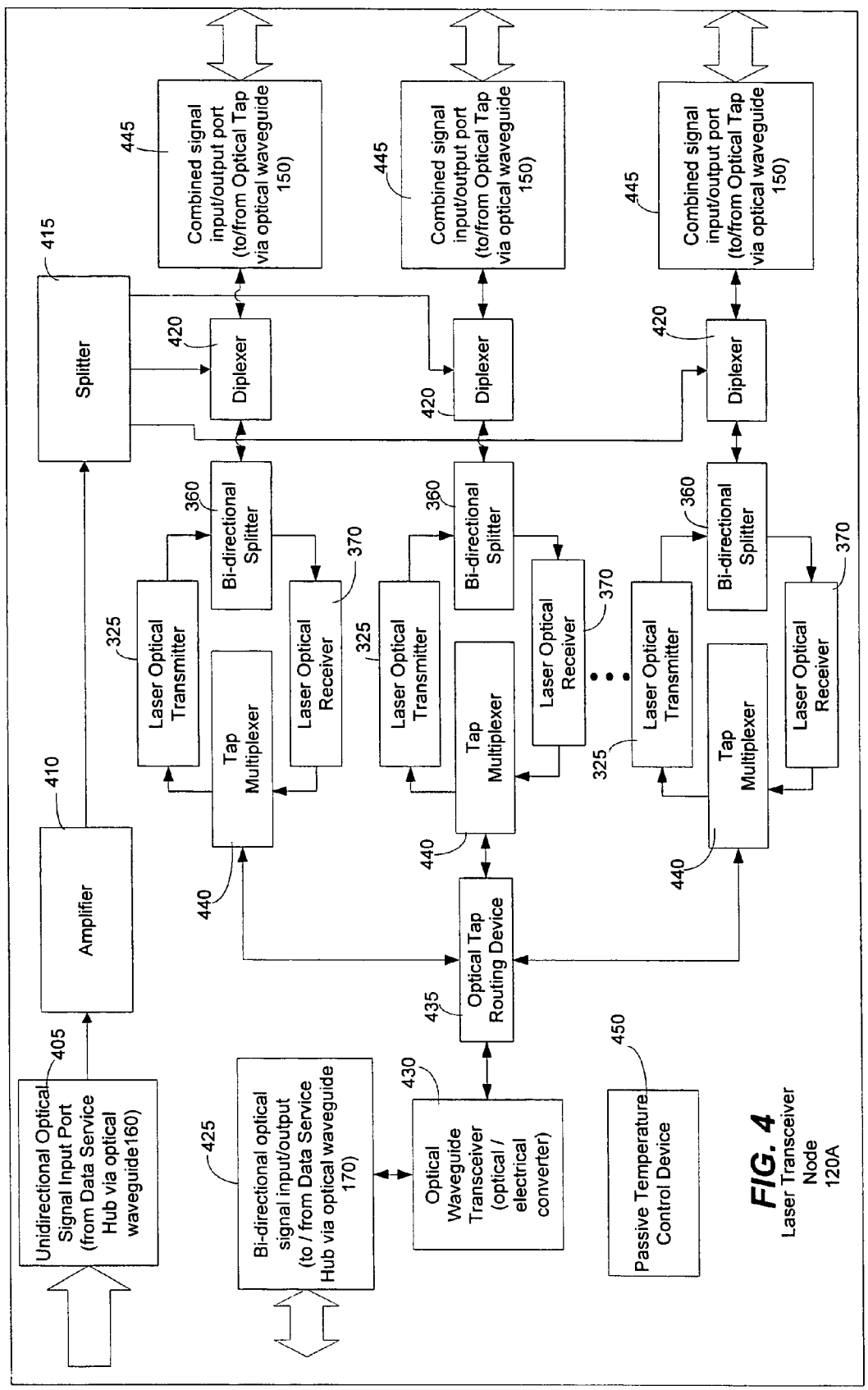
FIG. 4 is a functional block diagram illustrating an exemplary outdoor laser transceiver node according to the present invention.

Referring now to FIG. 4, this Figure illustrates a functional block diagram of an exemplary outdoor laser transceiver node 120 of the present invention. In this exemplary embodiment, the laser transceiver node 120 can comprise a unidirectional optical signal input port 405 that can receive optical signals propagated from the data service hub 110 that are propagated along a first optical waveguide 160. The optical signals received at the unidirectional optical signal input port 405 can comprise broadcast video data. The optical signals received at the input port 405 are propagated to an amplifier 410 such as an Erbium Doped Fiber Amplifier (EDFA) in which the optical signals are amplified. The amplified optical signals are then propagated to a splitter 415 that divides the broadcast video optical signals among diplexers 420 that are designed to forward optical signals to predetermined groups of subscribers.

The laser transceiver node 120 can further comprise a bidirectional optical signal input/output port 425 that connects the laser transceiver node 120 to a second optical waveguide 170 that supports bidirectional data flow between the data service hub 110 and laser transceiver node 120. Downstream optical signals flow through the bidirectional optical signal input/output port 425 to an optical waveguide transceiver 430 that converts downstream optical signals into the electrical domain. The optical waveguide transceiver further converts upstream electrical signals into the optical domain. The optical waveguide transceiver 430 can comprise an optical/electrical converter and an electrical/optical converter.

Downstream and upstream electrical signals are communicated between the optical waveguide transceiver 430 and an optical tap routing device 435. The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

Optical tap routing device 435 is notified of available upstream data packets as they arrive, by each tap multiplexer 440. The optical tap routing device is connected to each tap multiplexer 440 to receive these upstream data packets. The optical tap routing device 435 relays the packets to the data service hub 110 via the optical waveguide transceiver 430. The optical tap routing device 435 can build a lookup table from these upstream data packets coming to it from all tap multiplexers 440 (or ports), by reading the source IP address of each packet, and associating it with the tap multiplexer 440 through which it came. This lookup table can then be used to route packets in the downstream path. As each packet comes in from the optical waveguide transceiver 430, the optical tap routing device looks at the destination IP address (which is the same as the source IP address for the upstream packets). From the lookup table the optical tap routing device can determine which port is connected to that IP address, so it sends the packet to that port. This can be described as a normal layer 3 router function as is understood by those skilled in the art.

The optical tap routing device 435 can assign multiple subscribers to a signal port. More specifically, the optical tap routing device 435 can service groups of subscribers with corresponding respective signal ports. The optical taps 130 logically coupled to respective tap multiplexers 440 can supply downstream optical signals to pre-assigned groups of subscribers who receive the downstream optical signals with the subscriber optical interfaces 140.

In other words, the optical tap routing device 435 can determine which tap multiplexer 440 is to receive a downstream electrical signal, or identify which of a plurality of optical taps 130 propagated an upstream optical signal (that is converted to an electrical signal). The optical tap routing device 435 can format data and implement the protocol required to send and receive data from each individual subscriber connected to a respective optical tap 130. The optical tap routing device 435 can comprise a computer or a hardwired apparatus that executes a program defining a protocol for communications with groups of subscribers assigned to individual ports.

Exemplary embodiments of programs defining the protocol is discussed in the following copending and commonly assigned non-provisional patent applications, the entire contents of which are hereby incorporated by reference: "Method and System for Processing Downstream Packets of an Optical Network," filed on Oct. 26, 2001 in the name of Stephen A. Thomas et al. and assigned U.S. Ser. No. 10/045,652; and "Method and System for Processing Upstream Packets of an Optical Network," filed on Oct. 26, 2001 in the name of Stephen A. Thomas et al. and assigned U.S. Ser. No. 10/045,584.

The signal ports of the optical tap routing device are connected to respective tap multiplexers 440. With the optical tap routing device 435, the laser transceiver node 120 can adjust a subscriber's bandwidth on a subscription basis or on an as-needed or demand basis. The laser transceiver node 120 via the optical tap routing device 435 can offer data bandwidth to subscribers in pre-assigned increments. For example, the laser transceiver node 120 via the optical tap routing device 435 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 435 and respective tap multiplexers 440. The tap multiplexers 440 propagate optical signals to and from various groupings of subscribers. Each tap multiplexer 440 is connected to a respective optical transmitter 325. As noted above, each optical transmitter 325 can comprise one of a Fabry-Perot (F-P) laser, a distributed feedback laser (DFB), or a Vertical Cavity Surface Emitting Laser (VCSEL). Other laser technologies may be used within the scope of the invention. The optical transmitters produce the downstream optical signals that are propagated towards the subscriber optical interfaces 140. Each tap multiplexer 440 is also coupled to an optical receiver 370. Each optical receiver 370, as noted above, can comprise photoreceptors or photodiodes. Since the optical transmitters 325 and optical receivers 370 can comprise off-the-shelf hardware to generate and receive respective optical signals, the laser transceiver node 120 lends itself to efficient upgrading and maintenance to provide significantly increased data rates.

Each optical transmitter 325 and each optical receiver 370 are connected to a respective bi-directional splitter 360. Each bi-directional splitter 360 in turn is connected to a diplexer 420 which combines the unidirectional optical signals received from the splitter 415 with the downstream optical signals received from respective optical transmitter 325. In this way, broadcast video services as well as data services can be supplied with a single optical waveguide such as a distribution optical waveguide 150 as illustrated in FIG. 2. In other words, optical signals can be coupled from each respective diplexer 420 to a combined signal input/output port 445 that is connected to a respective distribution optical waveguide 150.

Unlike the conventional art, the laser transceiver node 120 does not employ a conventional router. The components of the laser transceiver node 120 can be disposed within a compact electronic packaging volume. For example, the laser transceiver node 120 can be designed to hang on a strand or fit in a pedestal similar to conventional cable TV equipment that is placed within the "last," mile or subscriber proximate portions of a network. It is noted that the term, "last mile," is a generic term often used to describe the last portion of an optical network that connects to subscribers.

Also because the optical tap routing device 435 is not a conventional router, it does not require active temperature controlling devices to maintain the operating environment at a specific temperature. In other words, the laser transceiver node 120 can operate in a temperature range between minus 40 degrees Celsius to 60 degrees Celsius in one exemplary embodiment.

While the laser transceiver node 120 does not comprise active temperature controlling devices that consume power to maintain temperature of the laser transceiver node 120 at a single temperature, the laser transceiver node 120 can comprise one or more passive temperature controlling devices 450 that do not consume power. The passive temperature controlling devices 450 can comprise one or more heat sinks or heat pipes that remove heat from the laser transceiver node 120. Those skilled in the art will appreciate that the present invention is not limited to these exemplary passive temperature controlling devices. Further, those skilled in the art will also appreciate the present invention is not limited to the exemplary operating temperature range disclosed. With appropriate passive temperature controlling devices 450, the operating temperature range of the laser transceiver node 120 can be reduced or expanded.

In addition to the laser transceiver node's 120 ability to withstand harsh outdoor environmental conditions, the laser transceiver node 120 can also provide high speed symmetrical data transmissions. In other words, the laser transceiver node 120 can propagate the same bit rates downstream and upstream to and from a network subscriber. This is yet another advantage over conventional networks, which typically cannot support symmetrical data transmissions as discussed in the background section above. Further, the laser transceiver node 120 can also serve a large number of subscribers while reducing the number of connections at both the data service hub 110 and the laser transceiver node 120 itself.

The laser transceiver node 120 also lends itself to efficient upgrading that can be performed entirely on the network side or data service hub 110 side. That is, upgrades to the hardware forming the laser transceiver node 120 can take place in locations between and within the data service hub 110 and the laser transceiver node 120. This means that the subscriber side of the network (from distribution optical waveguides 150 to the subscriber optical interfaces 140) can be left entirely in-tact during an upgrade to the laser transceiver node 120 or data service hub 110 or both.

The following is provided as an example of an upgrade that can be employed utilizing the principles of the present invention. In one exemplary embodiment of the invention, the subscriber side of the laser transceiver node 120 can service six groups of 16 subscribers each for a total of up to 96 subscribers. Each group of 16 subscribers can share a data path of about 450 Mb/s speed. Six of these paths represents a total speed of 6×450=2.7 Gb/s. In the most basic form, the data communications path between the laser transceiver node 120 and the data service hub 110 can operate at 1 Gb/s. Thus, while the data path to subscribers can support up to 2.7 Gb/s, the data path to the network can only support 1 Gb/s. This means that not all of the subscriber bandwidth is useable. This is not normally a problem due to the statistical nature of bandwidth usage.

An upgrade could be to increase the 1 Gb/s data path speed between the laser transceiver node 120 and the data service hub 110. This may be done by adding more 1 Gb/s data paths. Adding one more path would increase the data rate to 2 Gb/s, approaching the total subscriber-side data rate. A third data path would allow the network-side data rate to exceed the subscriber-side data rate. In other exemplary embodiments, the data rate on one link could rise from 1 Gb/s to 2 Gb/s then to 10 Gb/s, so when this happens, a link can be upgraded without adding more optical links.

The additional data paths (bandwidth) may be achieved by any of the methods known to those skilled in the art. It may be accomplished by using a plurality of optical waveguide transceivers 430 operating over a plurality of optical waveguides, or they can operate over one optical waveguide at a plurality of wavelengths, or it may be that higher speed optical waveguide transceivers 430 could be used as shown above. Thus, by upgrading the laser transceiver node 120 and the data service hub 110 to operate with more than a single 1 Gb/s link, a system upgrade is effected without having to make changes at the subscribers' premises.

Figure 5A:
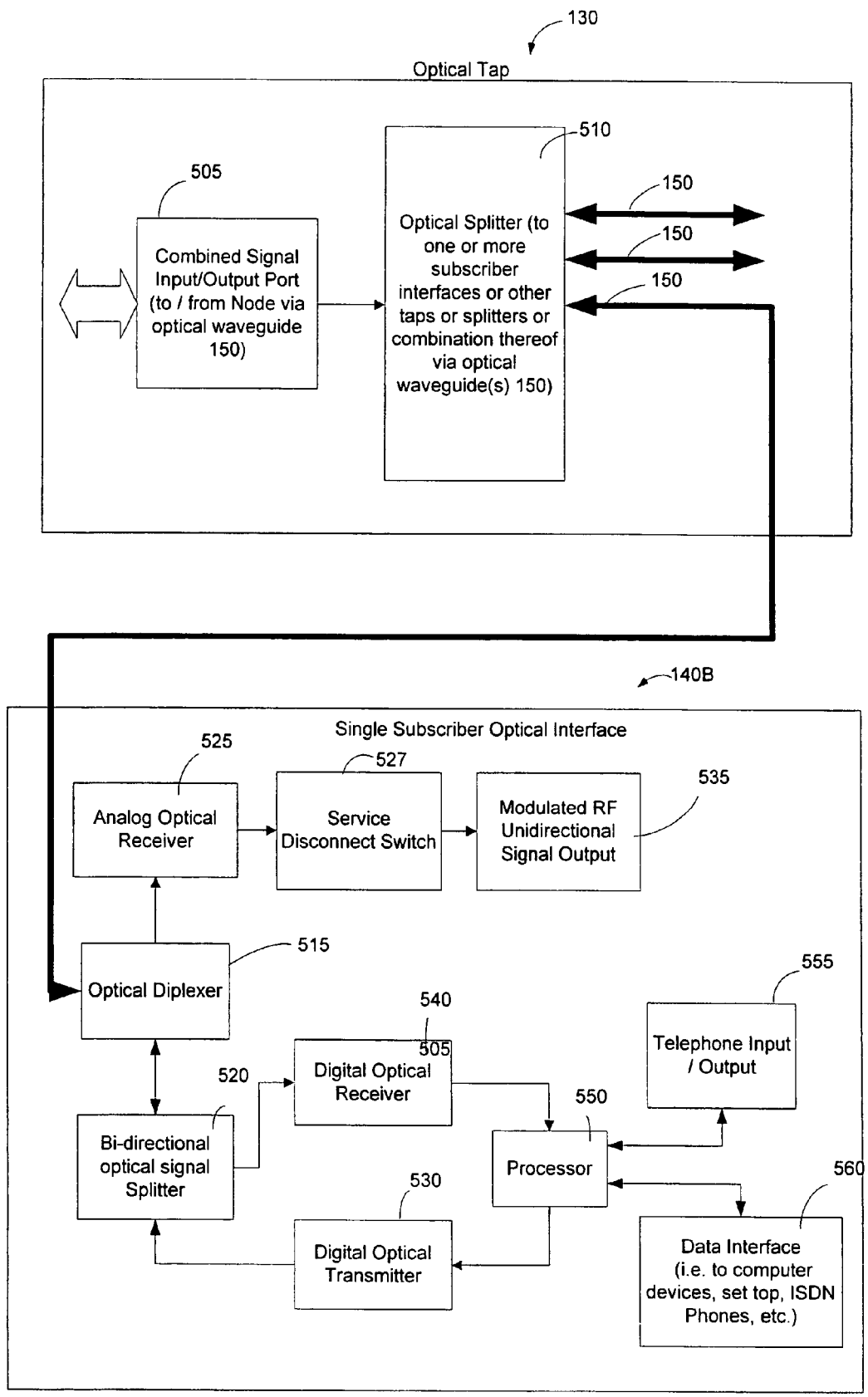
FIG. 5A is a functional block diagram illustrating an optical tap connected to a subscriber interface by a single optical waveguide according to one exemplary embodiment of the present invention.

Referring now to FIG. 5A, this Figure is a functional block diagram illustrating an optical tap 130 connected to a single-subscriber optical interface 140B by a single optical waveguide 150 according to one exemplary embodiment of the present invention. The optical tap 130 can comprise a combined signal input/output port 505 that is connected to another distribution optical waveguide that is connected to a laser transceiver node 120. As noted above, the optical tap 130 can comprise an optical splitter 510 that can be a 4-way or 8-way optical splitter. Other optical taps having fewer or more than 4-way or 8-way splits are not beyond the scope of the present invention. The optical tap can divide downstream optical signals to serve respective single subscriber optical interfaces 140B and muli-subscriber optical interfaces 140A (not shown). In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream to other distribution optical waveguides 150.

The optical tap 130 is an efficient coupler that can communicate optical signals between the laser transceiver node 120 and a respective subscriber optical interface 140. Optical taps 130 can be cascaded, or they can be connected in a star architecture from the laser transceiver node 120. As discussed above, the optical tap 130 can also route signals to other optical taps that are downstream relative to a respective optical tap 130.

Figure 12:
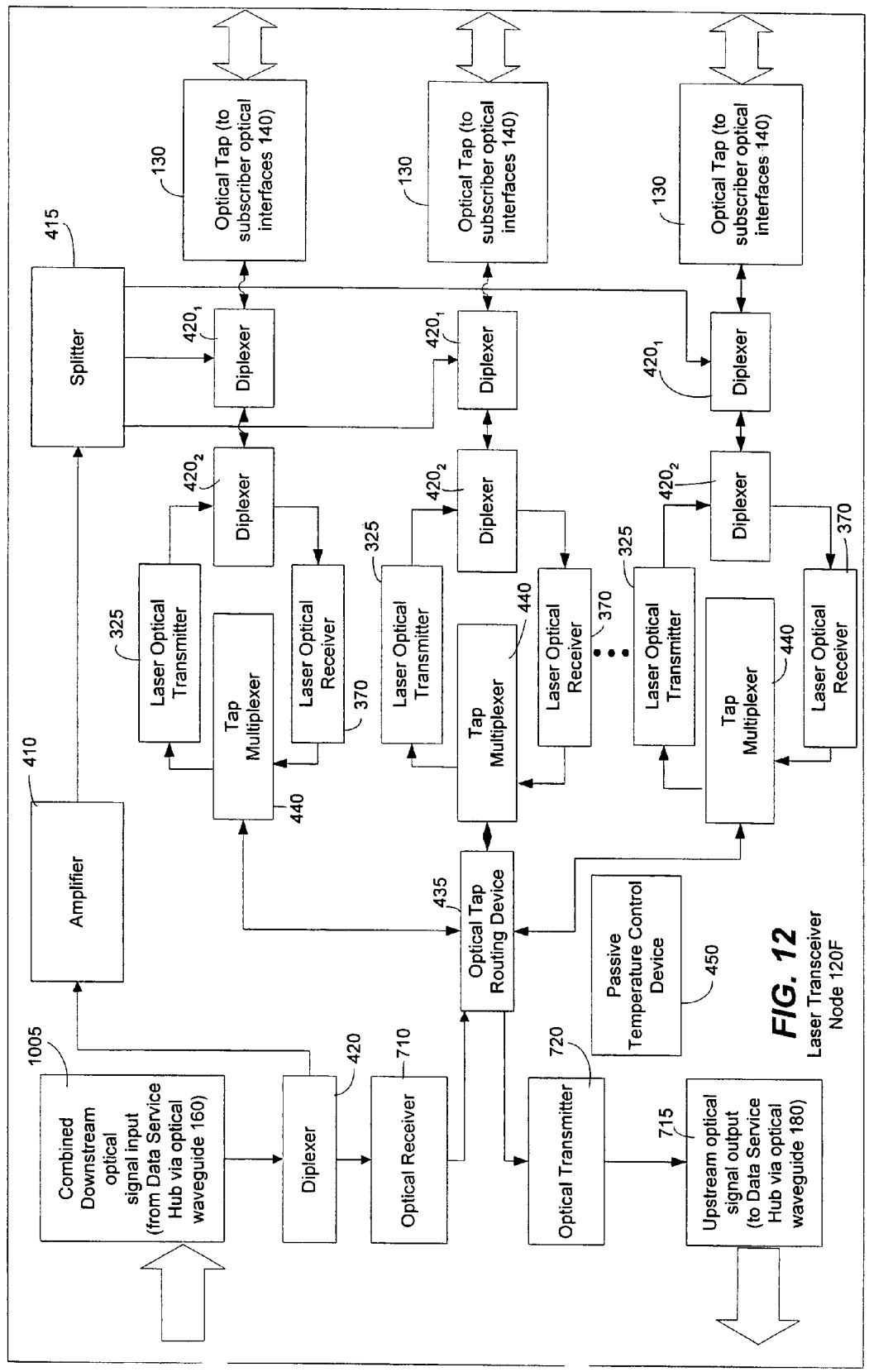
FIG. 12 is a functional block diagram illustrating another exemplary outdoor laser transceiver node that includes optical taps disposed within the laser transceiver node itself.

The optical tap 130 can also connect to a limited or small number of optical waveguides so that high concentrations of optical waveguides are not present at any particular laser transceiver node 120. In other words, in one exemplary embodiment, the optical tap can connect to a limited number of optical waveguides 150 at a point remote from the laser transceiver node 120 so that high concentrations of optical waveguides 150 at a laser transceiver node can be avoided. However, those skilled in the art will appreciate that the optical tap 130 can be incorporated within the laser transceiver node 120 as will be discussed in further detail below with respect to another exemplary embodiment of the laser transceiver node 120 as illustrated in FIG. 12.

The single-subscriber optical interface 140B functions to convert downstream optical signals received from the optical tap 130 into the electrical domain that can be processed with appropriate communication devices. The single-subscriber optical interface 140B further functions to convert upstream electrical signals into upstream optical signals that can be propagated along a distribution optical waveguide 150 to the optical tap 130. The single-subscriber optical interface 140B can comprise an optical diplexer 515 that divides the downstream optical signals received from the distribution optical waveguide 150 between a bi-directional optical signal splitter 520 and an analog optical receiver 525. A service disconnect switch 527 can be positioned between the analog optical receiver 525 and modulated RF unidirectional signal output 535.

The optical diplexer 515 can receive upstream optical signals generated by a digital optical transmitter 530. The digital optical transmitter 530 converts electrical binary/digital signals to optical form so that the optical signals can be transmitted back to the data service hub 110. Conversely, the digital optical receiver 540 converts optical signals into electrical binary/digital signals so that the electrical signals can be handled by processor 550.

The analog optical receiver 525 can convert the downstream broadcast optical video signals into modulated RF television signals that are propagated out of the modulated RF unidirectional signal output 535. The modulated RF unidirectional signal output 535 can feed to RF receivers such as television sets (not shown) or radios (not shown). The analog optical receiver 525 can process analog modulated RF transmission as well as digitally modulated RF transmissions for digital TV applications.

The bi-directional optical signal splitter 520 can propagate combined optical signals in their respective directions. That is, downstream optical signals entering the bi-directional optical splitter 520 from the optical diplexer 515, are propagated to the digital optical receiver 540. Upstream optical signals entering it from the digital optical transmitter 530 are sent to optical diplexer 515 and then to optical tap 130. The bi-directional optical signal splitter 520 is connected to a digital optical receiver 540 that converts downstream data optical signals into the electrical domain. Meanwhile the bi-directional optical signal splitter 520 is also connected to a digital optical transmitter 530 that converts upstream electrical signals into the optical domain.

The digital optical receiver 540 can comprise one or more photoreceptors or photodiodes that convert optical signals into the electrical domain. The digital optical transmitter can comprise one or more lasers such as the Fabry-Perot (F-P) Lasers, distributed feedback lasers, and Vertical Cavity Surface Emitting Lasers (VCSELs).

The digital optical receiver 540 and digital optical transmitter 530 are connected to a processor 550 that selects data intended for the instant subscriber optical interface 140 based upon an embedded address. The data handled by the processor 550 can comprise one or more of telephony and data services such as an Internet service. The processor 550 is connected to a telephone input/output 555 that can comprise an analog interface.

The processor 550 is also connected to a data interface 560 that can provide a link to computer devices, set top boxes, ISDN phones, and other like devices. Alternatively, the data interface 560 can comprise an interface to a Voice over Internet Protocol (VoIP) telephone or Ethernet telephone. The data interface 560 can comprise one of Ethernet's (10 BaseT, 100 BaseT, Gigabit) interface, HPNA interface, a universal serial bus (USB) an IEEE1394 interface, an ADSL interface, and other like interfaces.

Figure 5B:
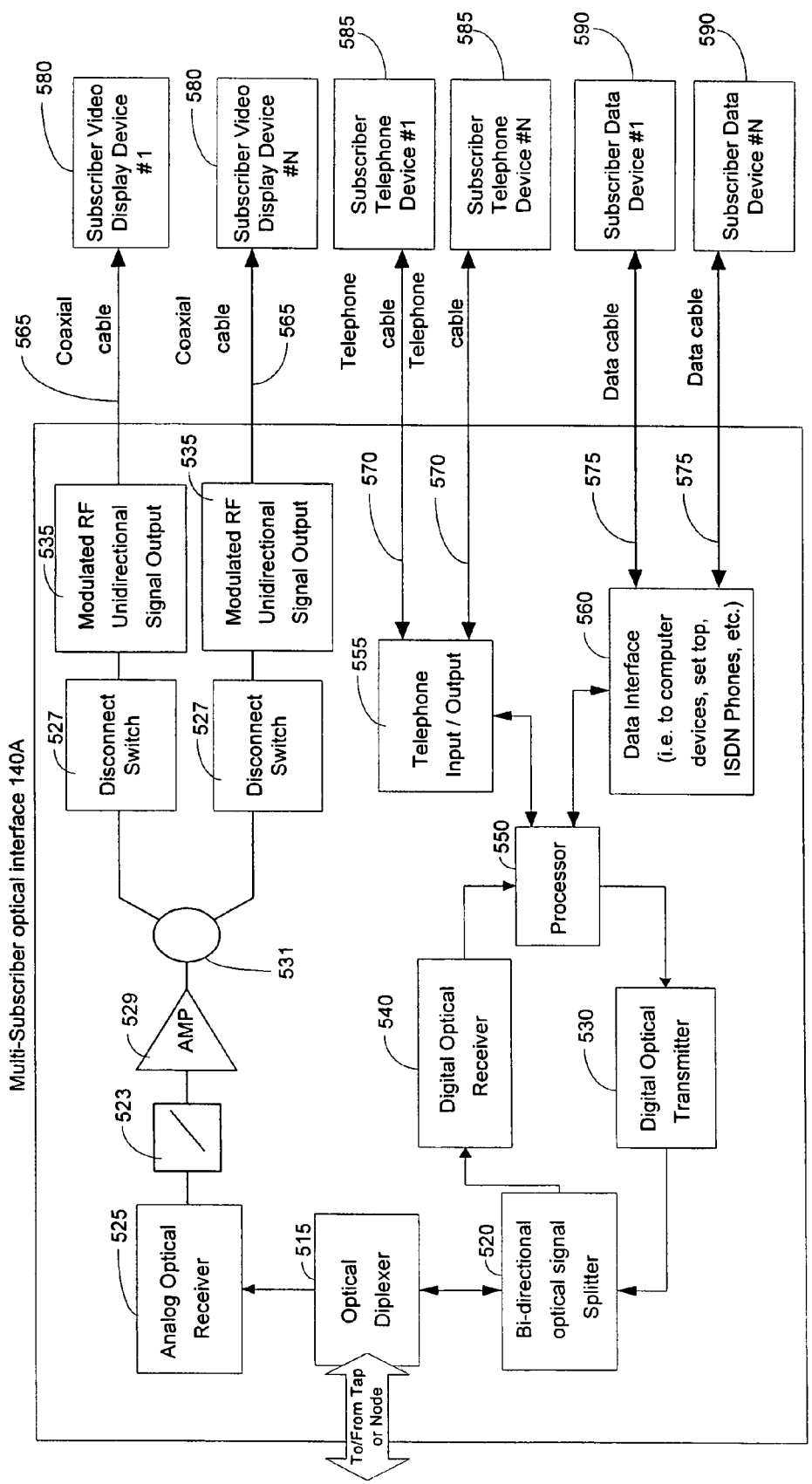
FIG. 5B is a functional block diagram illustrating a multi-subscriber optical interface according to one exemplary embodiment of the present invention.

Referring now to FIG. 5B, this figure is a functional block diagram illustrating a multi-subscriber optical interface 140A. Only the elements of the multi-subscriber optical interface 140A that are different relative to the single-subscriber optical interface 140B will be discussed below. The multi-subscriber optical interface 140A comprises a tilt network 523, an amplifier 529, and an RF splitter 531. These three components typically support video services for subscribers of the optical network. A tilt network 523 attenuates lower frequency signals to bring the signal strength across the frequency range back into balance at the subscriber video display device 580. As noted previously, higher frequencies loose signal strength faster than low frequencies as they are being transmitted over coaxial cable. The tilt network 523 can compensate for this additional loss of signal strength at higher frequencies.

The amplifier 529 amplifies downstream analog electrical signals while the RF splitter 531 divides the downstream analog electrical signals among a plurality of subscribers. The RF splitter feeds its downstream energy through respective disconnect switches 527 that control a service for a particular subscriber.

Coaxial cables 565 connect subscriber video display devices 580 with respective modulated RF unidirectional signal output 535 of the multi-subscriber optical interface 140A. Further, telephone cables 570 connect subscriber telephone devices 585 to the telephone input/output device 555.

Data cables 575 couple each subscriber data device 590 to the data interface 560. Each subscriber data device 590 can comprise a computer, an ISDN phone, and other like devices. Each data cable can comprise an Ethernet cable, but other data cable types are not beyond the scope of the present invention.

Figure 5C:
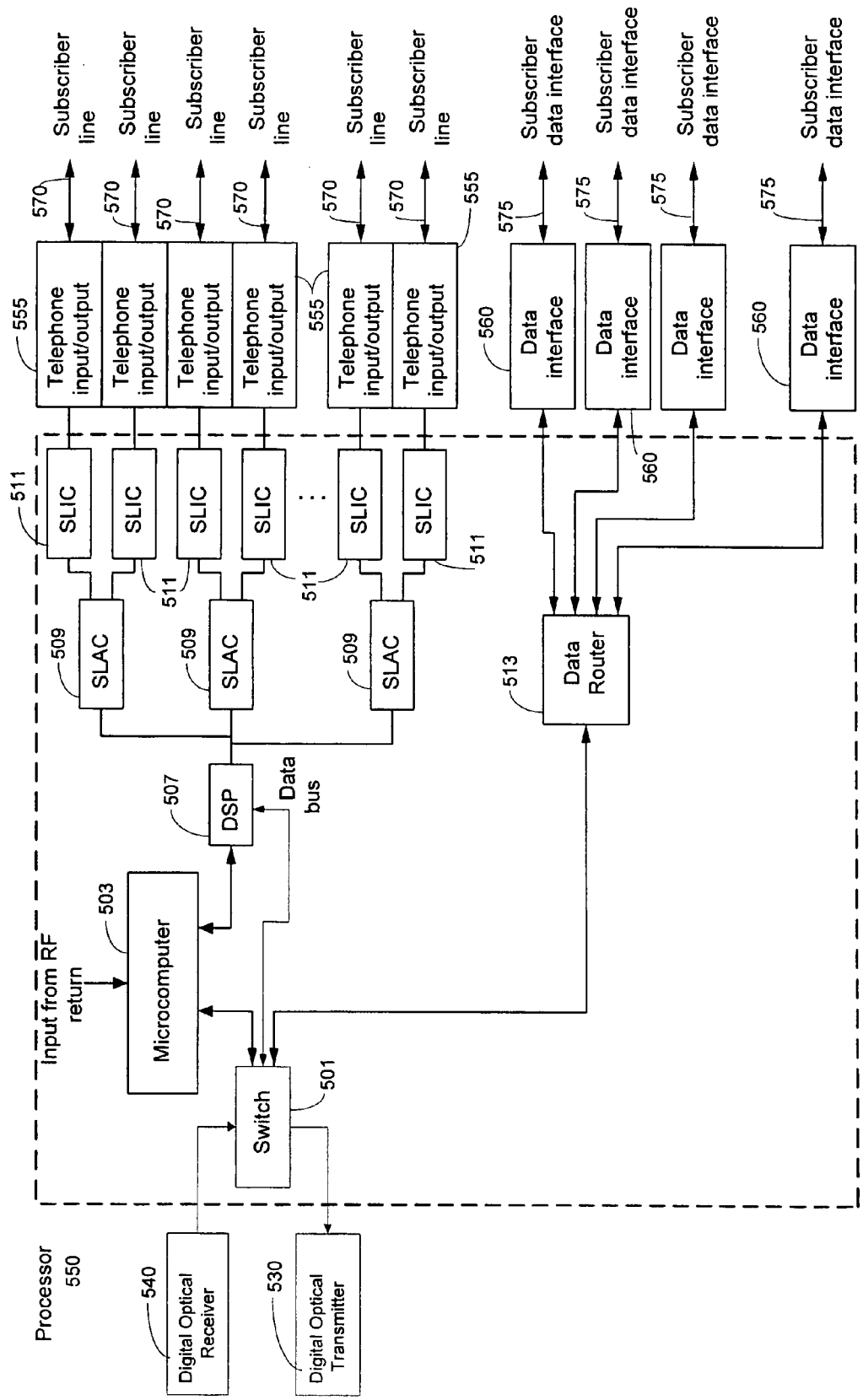
FIG. 5C is a functional block diagram illustrating an exemplary processor of FIG. 5B according to one exemplary embodiment of the present invention.

Referring now to FIG. 5C, this figure is a functional block diagram illustrating an exemplary processor 550 that is depicted in FIG. 5B. The processor 550 as illustrated in FIG. 5C comprises a switch 501, a microcomputer 503, a digital signal processor 507 and a data router 513. The switch 501 is connected to the microcomputer 503 as well as the digital optical receiver 540 and the digital optical transmitter 530. The microcomputer 503 supplies telephone signals to the digital signal processor 507. The microcomputer 503 can also comprise part of a RF return path as will be described in further detail below.

The digital signal processor receives and transmits telephone signals to the microcomputer 503. The digital signal processor 507 can perform functions such as echo cancellation. The digital signal processor 507 can be connected to one or more subscriber line audio-processing circuits (SLACs) which perform various processing routines needed in telephone systems. For example, each SLAC 509 can be responsible for such functions as generating ring tones, interpreting dialing tones, and converting between digital and analog telephone signals. A single SLAC 509 may include circuitry to manage one phone line or it may contain circuitry to manage a plurality of telephone lines.

The digital signal processor 507 can interface with a plurality of SLACs 509 by way of a data bus 517. Each SLAC 509 can also be connected to a subscriber line interface circuit (SLIC) 511. Each SLIC 511 can include analog interface circuits necessary converting digital signals for conventional analog telephone equipment. Each SLIC 511 can interface with one or more telephone input/output interfaces 555.

Also coupled to switch 501 is data router 513. The data router 513 can comprise a standard internet protocol router 513 that is connected between the switch 501 and a plurality of data interfaces 560. The data router 513 can comprise a router operating at level 3 in the standard 7-layer communications model, or it may comprise a switch operating at level 2 in the standard 7-layer communications model. The data router 513 manages data services for a plurality of subscribers that are coupled to the multi-subscriber optical interface 140A. Each subscriber data device 590 coupled to a respective data interface 560 can be managed by using a media access control (MAC) address, as known in the art. The data router is also useful to provide data to each individual subscriber, while not sending data intended for any other subscribers to his location, preventing "snooping," or hacking the system to monitor someone else's data.

Figure 5D:
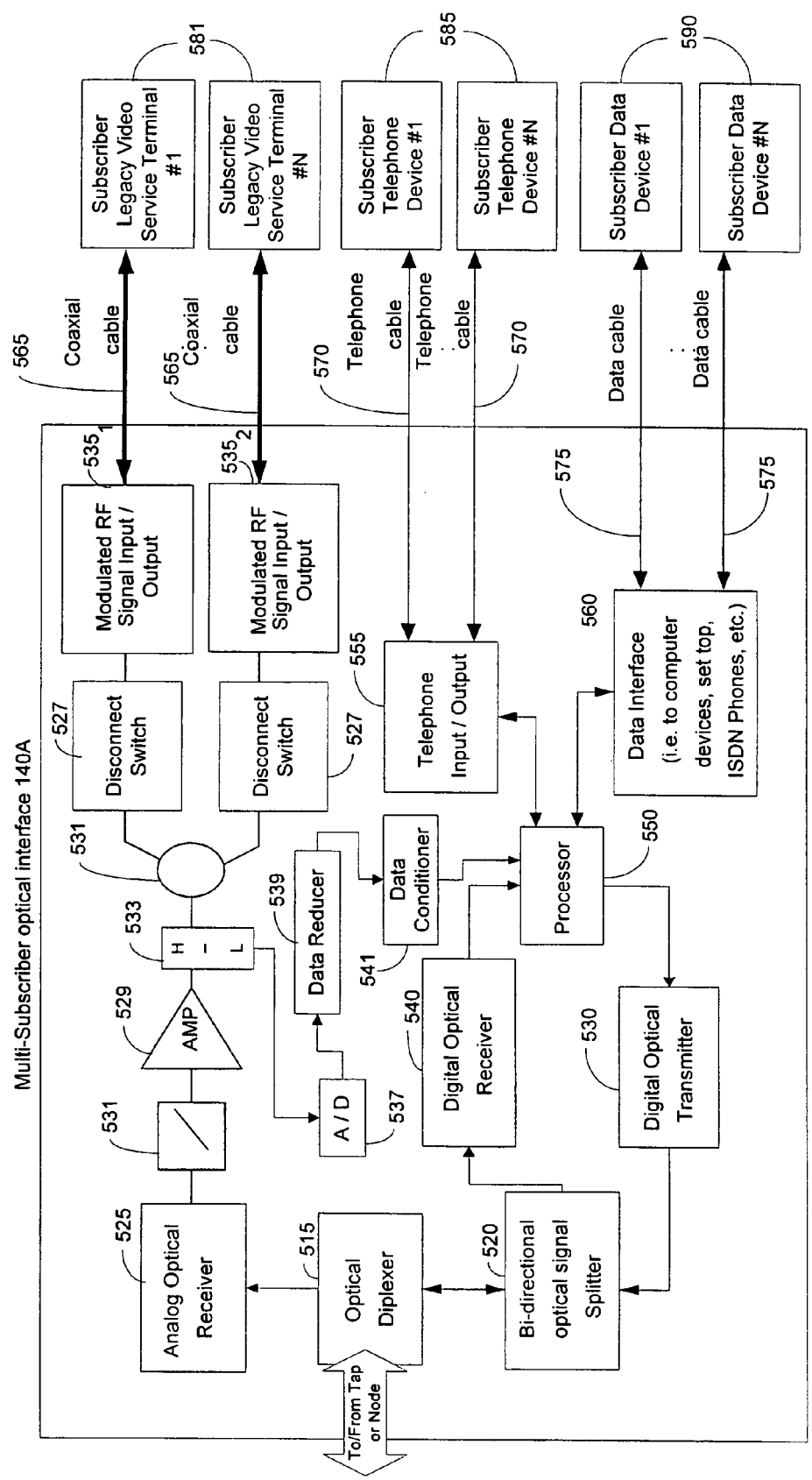
FIG. 5D is a functional block diagram illustrating a multi-subscriber optical interface according to an alternative exemplary embodiment of the present invention.

Referring now to FIG. 5D, this figure is a functional block diagram illustrating an alternate exemplary embodiment of a multi-subscriber optical interface 140A in accordance with a present invention. The multi-subscriber optical interface 140A FIG. 5D further comprises an RF return path. Further details of this RF return path are described in co-pending non-provisional patent application entitled, "Method and System for Providing a Return Path for Signals Generated by Legacy Terminals in an Optical Network," filed on Jan. 8, 2002 and assigned U.S. Ser. No. 10/041,299, the entire contents of which are hereby incorporated by reference.

The RF return path of FIG. 5D comprises another diplexer 533 that is connected between the amplifier 529 and RF splitter 531. When a legacy video service terminal 581 generates RF signals, these RF signals are propagated through the modulated RF signal input/output 535 to the diplexer 533.

The diplexer 533 passes the upstream analog RF signals to an analog-to-digital (A/D) converter 537. From the A/D converter 537, the digital RF signals are passed to a data reducer 539. Further details of a data reducer 539 are discussed in co-pending non-provisional application Ser. No. 10/041,299, referenced above and which is incorporated by reference. The data reducer 539 can comprise additional components (not shown) that removes unnecessary numbers of bits from each sampled upstream RF signal, while maintaining the maximum scaling of the data.

After reducing the upstream RF signals, the data reducer 539 passes the processed RF signals to a data conditioner 541 that can comprise a buffer such as a FIFO. A FIFO, a special purpose circuit known to those skilled in the art, takes in data at a first data rate, and puts out the data ("plays it out") at a second data rate suitable for transmission.

The FIFO can input a time stamp and identification information with the digitized upstream RF signals to form RF packets. That is, a RF packet can comprise digitized and RF signals that are coupled with identification and timing information. Further details of the data conditioner 541 are discussed in co-pending non-provisional application Ser. No. 10/041,299, referenced above and incorporated by reference. The data conditioner 541 feeds its RF packets to the processor 550.

Figure 5E:
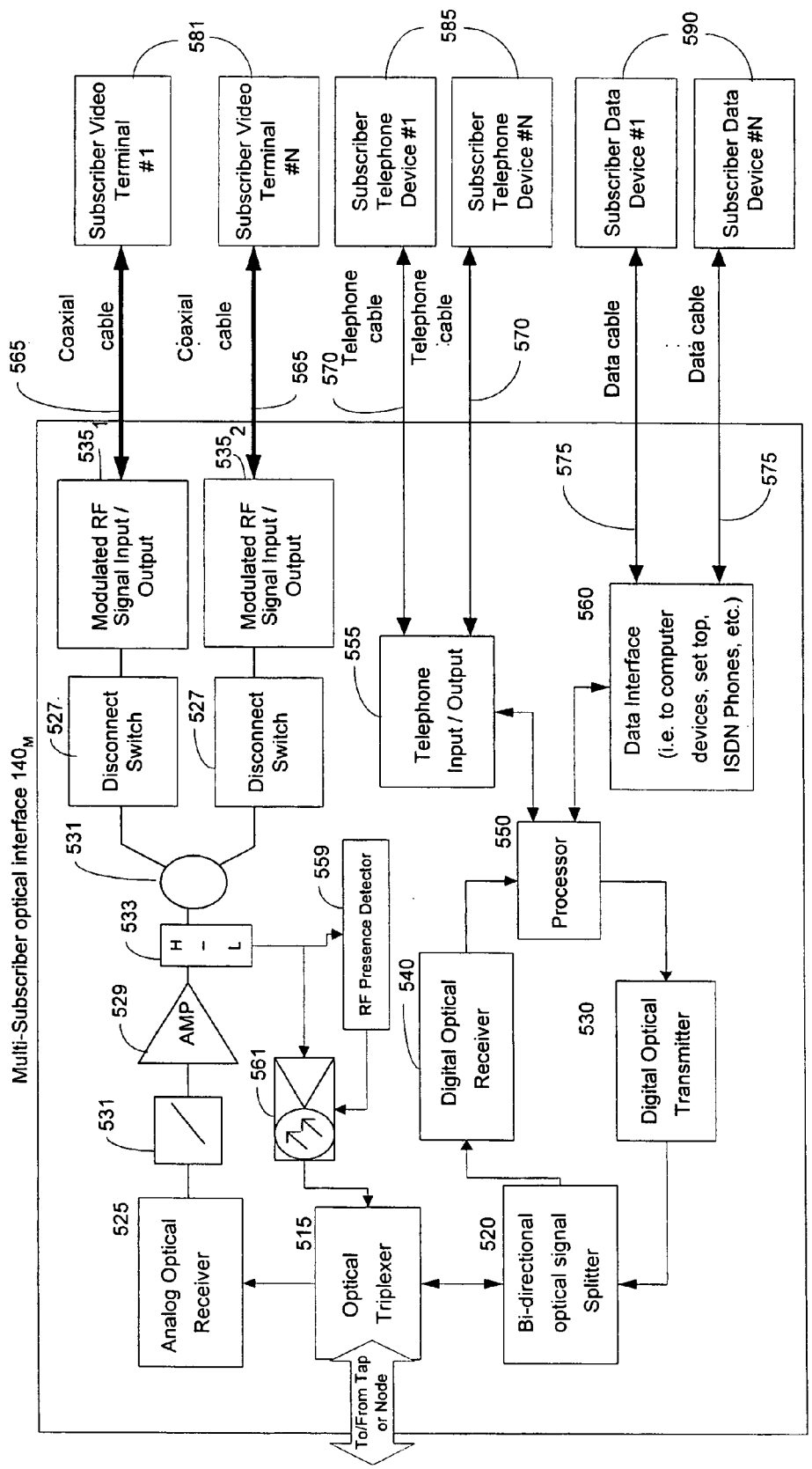
FIG. 5E is a functional block diagram illustrating a multi-subscriber optical interface according to yet another alternative exemplary embodiment of the present invention.

Referring now to FIG. 5E this figure illustrates another alternative exemplary embodiment of a multi-subscriber optical interface 140A according to the present invention. In this particular embodiment, the RF return path comprises an inexpensive amplitude modulated (AM-analog) optical transmitter 561. A wavelength admitted by the AM optical transmitter 561 usually must not be in the 1310 nanometer wavelength region because other users may be using data transported at this wavelength.

Suitable wavelengths for the AM optical transmitter 561 include 1490 nano meters plus/minus 10 nano meters, which is being used for some specialized applications, other wavelengths in the vicinity of 1550 nanometers not being used by the analog optical transmission path, and 1625 nanometers which is sometimes used for internal communications within optical networks. However, the present invention is not limited to these wavelength regions and can include regions higher or lower than described without departing from the scope and spirit of the present invention. The RF return path illustrated in FIG. 5E further comprises an RF presence detector 372 which detects the existence of RF data and turns on the transmitter 561 upon detection RF signals.

Further details of this exemplary RF return path are described in co-pending non-provisional application Ser. No. 10/041,299 discussed above and incorporated by reference. The RF return path illustrated in FIG. 5E further includes an optical triplexer 519 which combines upstream data signals channeled through the bi-directional optical signals splitter 520 and emitted from the AM optical transmitter 561. The triplexer 519 operates the same as the previously described optical biplexer 515, except that a third input has been added, at a wavelength different from the upstream data signals emitted from the bi-directional optical signals splitter 520 and received in the downstream direction from the optical paths. Such triplexers 519 are known to those skilled in the art.

Figure 6:
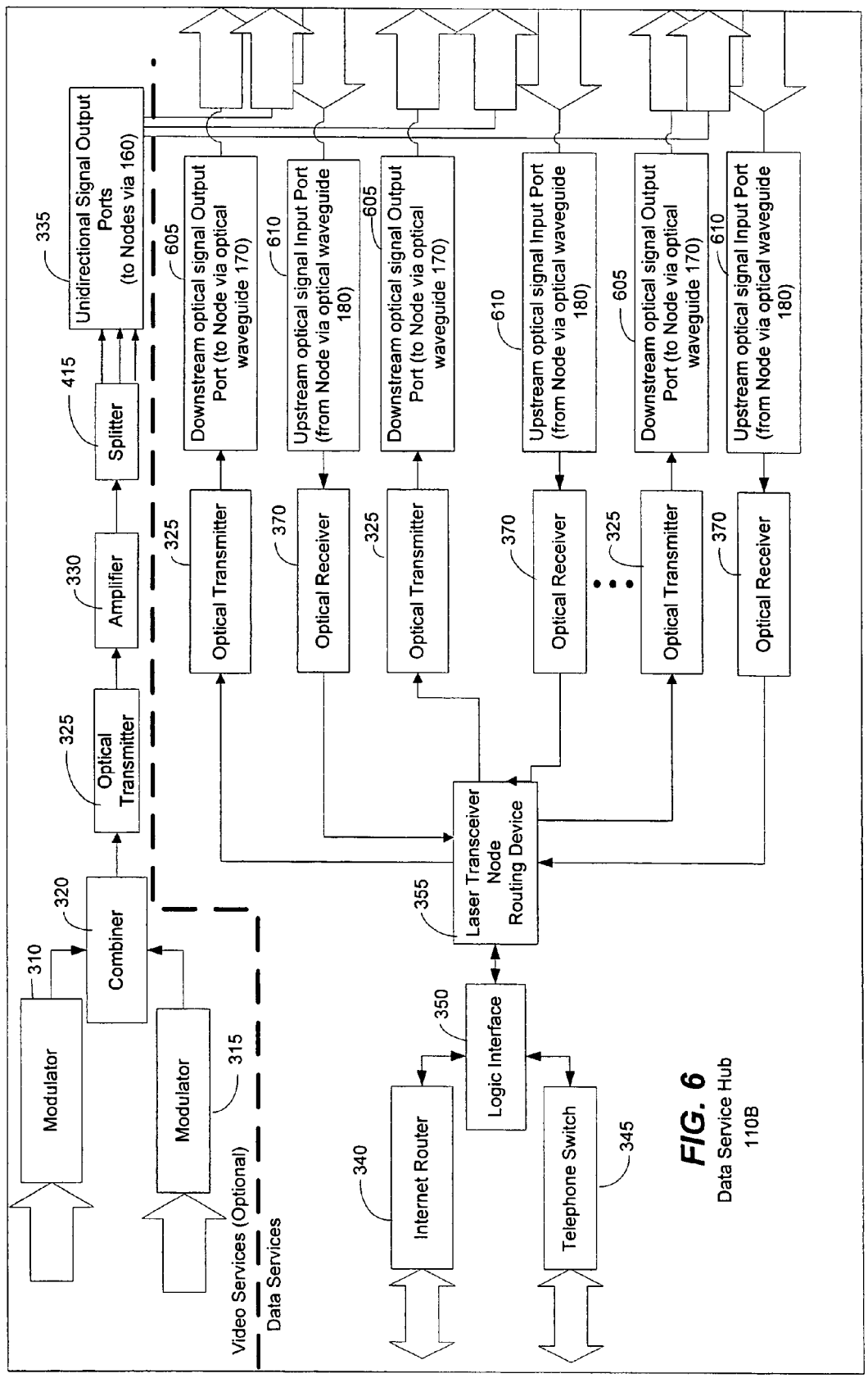
FIG. 6 is a functional block diagram illustrating an exemplary data service hub according to an alternative exemplary embodiment of the present invention where upstream optical signals and downstream optical signals are propagated along separate optical waveguides.

Referring now to FIG. 6, this figure is a functional block diagram illustrating an exemplary data service hub 110B according to an alternative exemplary embodiment of the present invention where upstream optical signals and downstream optical signals are propagated along separate optical waveguides such as the second optical waveguide 170 and the third optical waveguide 180 discussed above with respect to FIG. 1. In other words, in this exemplary embodiment, the second optical waveguide 170 is designed to carry only downstream optical signals while the third optical waveguide 180 is designed to carry only upstream optical signals from the laser transceiver node 120.

The exemplary data service hub 110B further comprises a downstream optical signal output port 605 that is coupled to the second optical waveguide 170. The data service hub 110B further comprises an upstream optical signal input port 610 that is coupled to the third optical waveguide 180. With the exemplary data service hub 110B separate optical waveguides 180 and 170 carry the respective upstream and downstream optical transmissions. With this exemplary embodiment, power can be conserved since additional components that were previously used to combine and separate the upstream and downstream optical signals are eliminated.

This exemplary embodiment of the data service hub 110B can further reduce distance limitations due to power loss and cross talk. In other words, at each end of an optical transmitter, which is supplying a lot of optical power compared with the received power, can create interference at the receiver due to incomplete isolation between the upstream and downstream optical signal directions. By utilizing separate optical waveguides for the upstream and downstream optical signals, this interference can be substantially reduced or eliminated.

Figure 7:
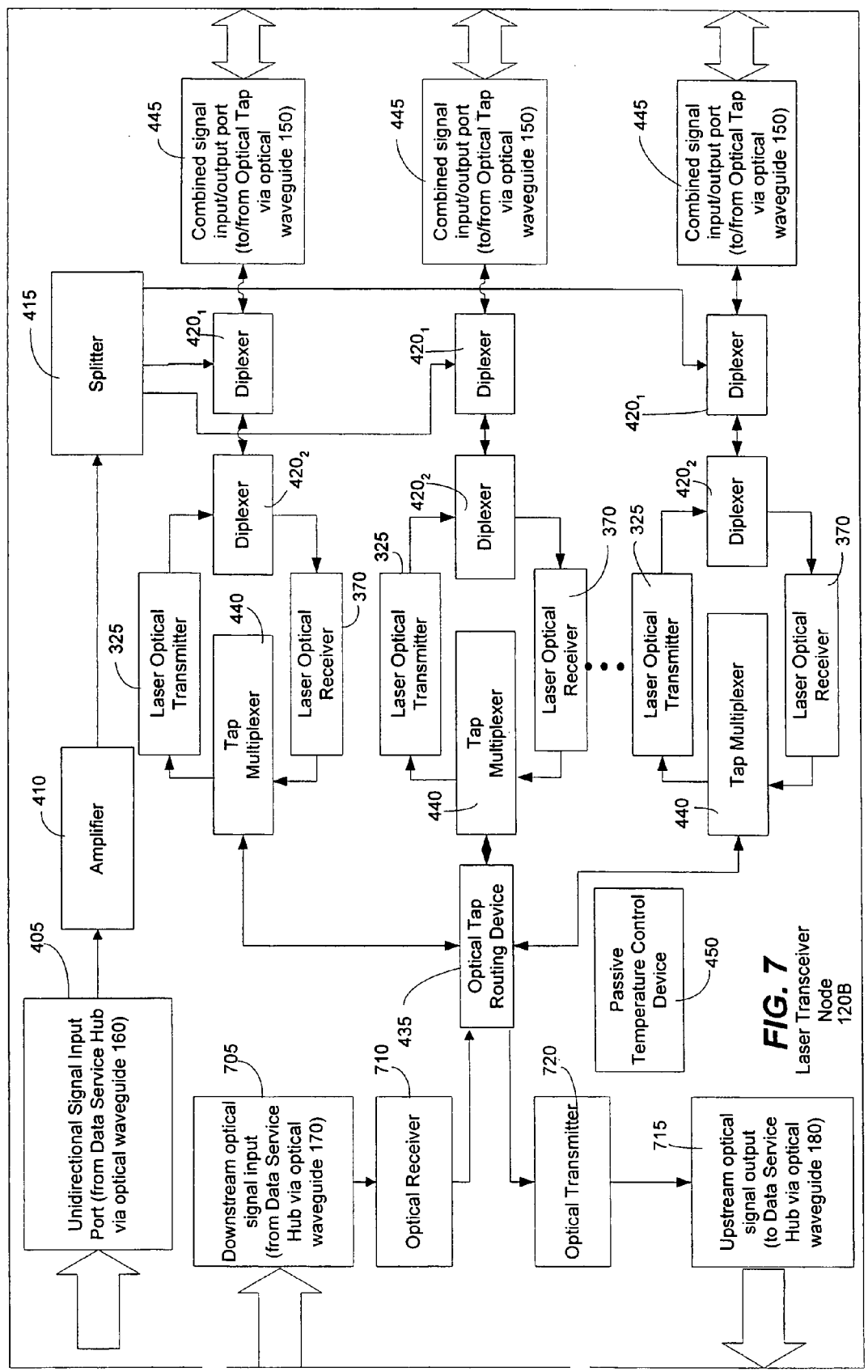
FIG. 7 is a functional block diagram illustrating an exemplary outdoor laser transceiver node that can accept upstream and downstream optical signals that are propagated along separate optical waveguides in addition to unidirectional signals that can be mixed with the downstream optical signals.

Referring now to FIG. 7, this Figure illustrates a functional block diagram of an exemplary outdoor laser transceiver node 120B that can accept upstream and downstream optical signals that are propagated along separate optical waveguides in addition to unidirectional signals that can be mixed with downstream optical signals. In other words, the laser transceiver node 120B can be coupled to the exemplary data service hub 110B illustrated in FIG. 6.

The laser transceiver node 120B can comprise a downstream optical signal input port 705 that is coupled to the second optical waveguide 170 as illustrated in FIG. 1. The downstream optical signal input port 705 is coupled to an optical receiver 710 that converts the downstream optical signals into the electrical domain. The optical receiver 710 in turn, feeds the electrical signals to the optical tap routing device 435.

The laser transceiver node 120B of FIG. 7 can further comprise an optical transmitter 720 that converts electrical signals received from the optical tap routing device 435 into the optical domain. The optical signals generated by the optical transmitter 720 are fed to an upstream optical signal output port 715. The upstream optical signal output port 715 is coupled to the third optical waveguide 180 as illustrated in FIG. 1.

Compared to the exemplary laser transceiver node 120A illustrated in FIG. 4, the bi-directional splitter 360 has been replaced with a second diplexer $420_2$. The optical transmitter 325 generates optical signals of a wavelength that is higher than the upstream optical signals produced by a respective subscriber optical interface 140. For example, in one exemplary embodiment, the optical transmitter 325 can produce optical signals having wavelengths between 1410 and 1490 nm while the upstream optical signals remain at the 1310 nm wavelength region.

As noted above, those skilled in the art will appreciate that the wavelengths discussed are only illustrative in nature. In some scenarios, it may be possible to use communication windows at 1310 and 1550 nm in different ways without departing from the scope and spirit of the present invention. Further, the present invention is not limited to the wavelength regions discussed above. Those skilled in the art will appreciate that smaller or larger wavelengths for the optical signals are not beyond the scope and spirit of the present invention.

Because of the difference in wavelength regions between the upstream and downstream optical signals, the additional diplexer $420_2$ can be substituted for the previous bidirectional splitter 360 (illustrated in the exemplary embodiment of FIG. 4). The additional or substituted diplexer $420_2$ does not exhibit the same loss as the previous bi-directional splitter 360 that is used in the exemplary embodiment of FIG. 4. This substitution of the bi-directional splitter 360 with the additional diplexer $420_2$ can also be applied to the subscriber optical interface 140. That is, when the upstream and downstream optical signals are operating at respective different wavelength regions, the bi-directional optical signal splitter 520 of the subscriber optical interface 140 can be substituted with a diplexer $420_2$. The substitution of the bi-directional splitter 360 with the diplexer 420 can reduce the optical loss between the laser transceiver node 120 and the subscriber optical interface 140.

Alternatively, if the laser transceiver node 120 is using the same wavelengths for the upstream and downstream optical signals, the optical interface 140 uses the bi-directional optical signal splitter 520 with a corresponding loss in optical power as illustrated in FIG. 5. Those skilled in the art will appreciate that various other substitutions for the components of the laser transceiver node 120 can be made without departing from the scope and spirit of the present invention.

Figure 8:
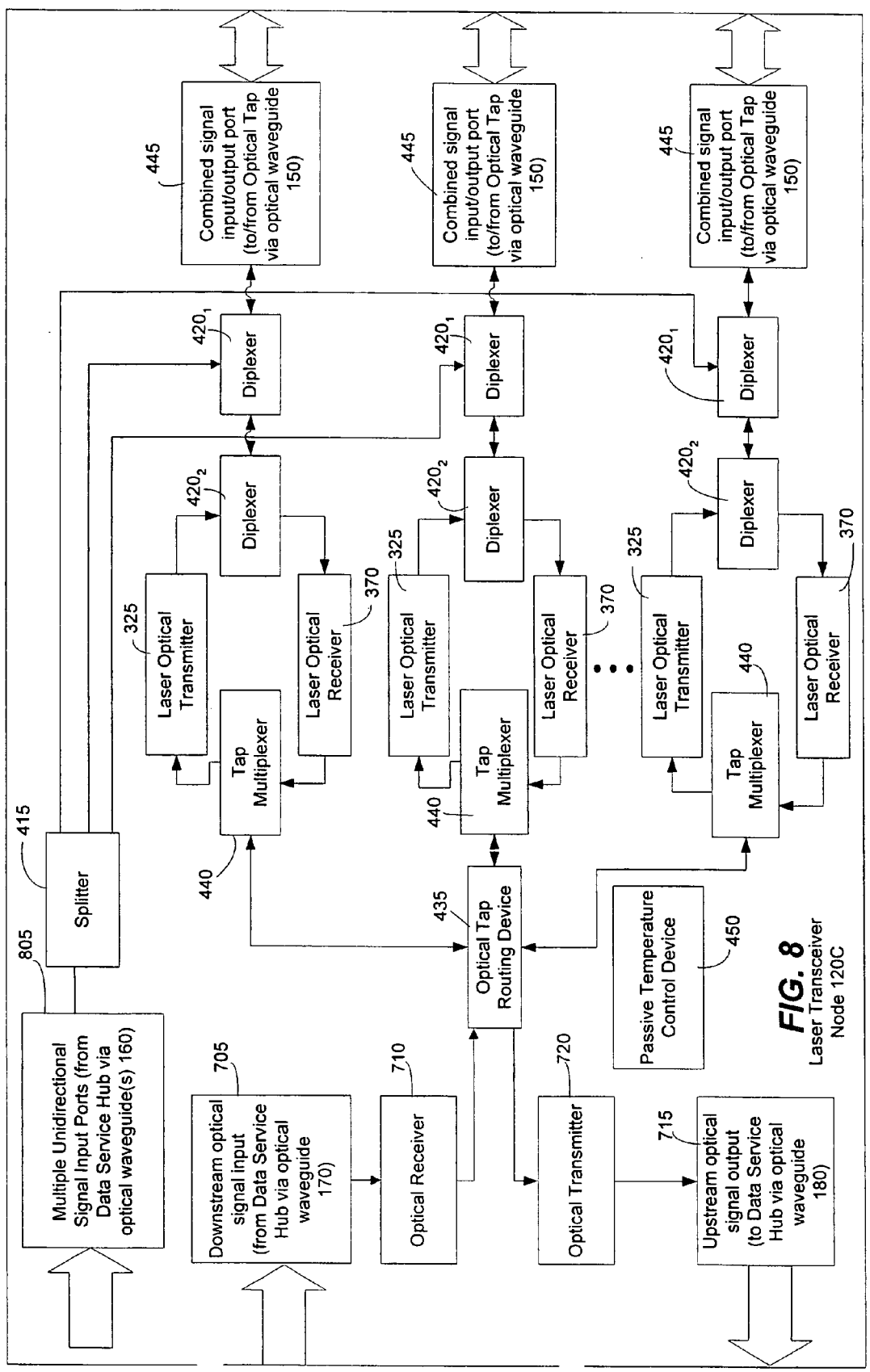
FIG. 8 is a functional block diagram illustrating yet another exemplary outdoor laser transceiver node that can accept optical signals propagating in separate upstream and downstream optical waveguides in addition to multiple optical waveguides that propagate unidirectional signals.

Referring now to FIG. 8, this Figure illustrates another exemplary outdoor, laser transceiver node 120C that can accept optical signals propagating from separate upstream and downstream optical waveguides in addition to multiple optical waveguides that propagate unidirectional signals. In this exemplary embodiment, the laser transceiver node 120C of FIG. 8 can comprise multiple unidirectional signal input ports 805 that are coupled to a plurality of first optical waveguides 160. In this exemplary embodiment, compared to the laser transceiver node 120A of FIG. 4 and laser transceiver node 120B of FIG. 7, the amplifier 410 has been removed from the laser transceiver node 120C as illustrated in FIG. 8. The amplifier 410 is taken out of the laser transceiver node 120C and placed in the data service hub 110.

The optical signals propagating from the multiple first optical waveguides 160 are combined with the upstream and downstream optical signals originating from the second set of diplexers $420_2$ using the first set of diplexers $420_1$. This design to remove the amplifier 410 (that typically comprises an Erbium Doped Fiber Amplifier—EDFA) from the laser transceiver node 120C of FIG. 8 to the data service hub 110 and to include multiple first optical waveguides 160 feeding into the laser transceiver node 120C, may be made on the basis of economics and optical waveguide availability.

Figure 9:
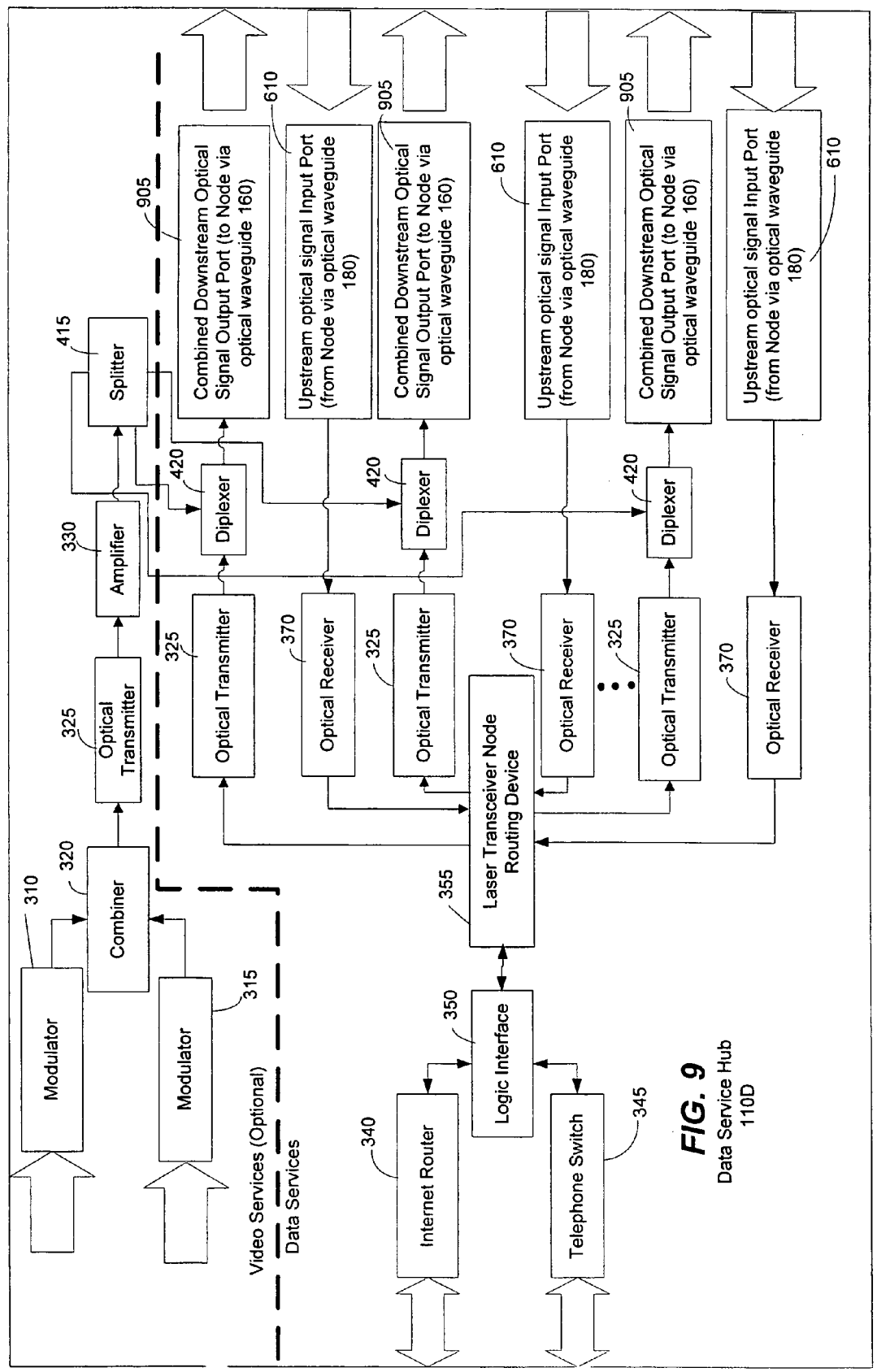
FIG. 9 is a functional block diagram illustrating another exemplary embodiment of a data service hub in which unidirectional signals such as video or RF signals are combined with downstream optical signals.

FIG. 9 illustrates another exemplary embodiment of a data service hub 110D in which unidirectional signals such as video or RF signals are combined with downstream optical signals. In this exemplary embodiment, the data service hub 110D further comprises a splitter 415 that feeds the broadcast video optical signals to respective diplexers 420. The respective diplexers 420 combine the broadcast video optical signals with the downstream data optical signals produced by respective optical transmitters 325. In this way, the first optical waveguide 160 as illustrated in FIG. 1 can be eliminated since the broadcast video optical signals are combined with the downstream data optical signals along the second optical waveguide 170.

Figure 10:
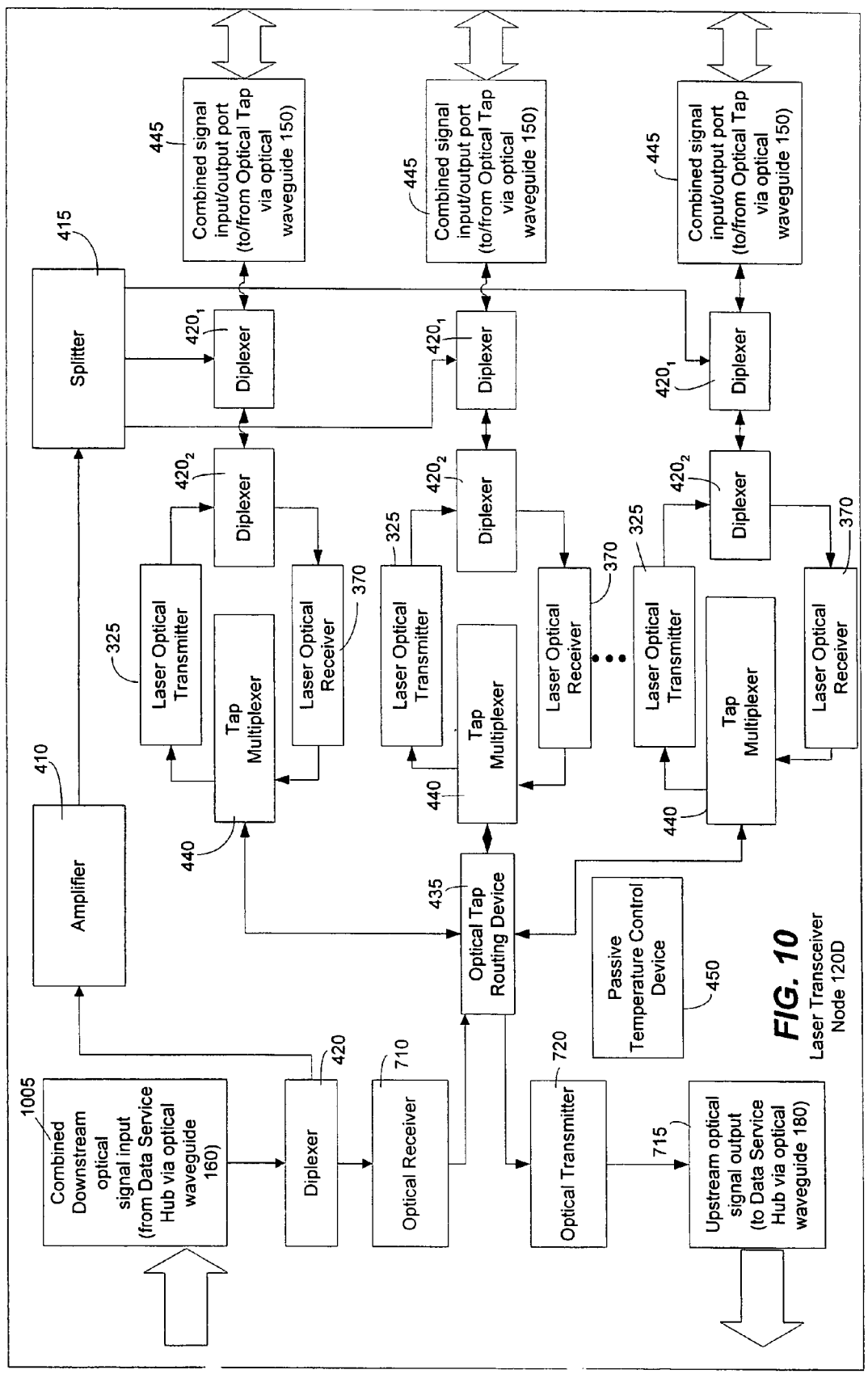
FIG. 10 is a functional block diagram illustrating another exemplary outdoor laser transceiver node that can process a combined downstream signal that comprises downstream optical signals in addition to unidirectional signals like RF transmissions or video data.

FIG. 10 illustrates another exemplary laser transceiver node 120D that can be coupled to the data service hub 110D as illustrated in FIG. 9. In this exemplary embodiment, the laser transceiver node 120D comprises a combined downstream optical signal input 1005 that is coupled to a second optical waveguide 160 that provides a combined downstream optical signal comprising broadcast video services and data service. The laser transceiver node 120D further comprises a diplexer 420 that feeds the broadcast video or RF signals to an amplifier 410. The broadcast video or RF optical signals are then sent to a splitter 415 which then sends the optical signals to the first set of diplexers $420_1$. The combination of the data service hub 110D as illustrated in FIG. 9 and the laser transceiver node 120D as illustrated in FIG. 10 conserves optical waveguides between these two devices.

As noted above, in another exemplary embodiment, it may be possible to use only a single fiber (not shown) to operatively link a data service hub 110 and a laser transceiver node 120. In such an exemplary embodiment, different wavelengths could be used to propagate upstream and downstream optical signals.

Figure 11:
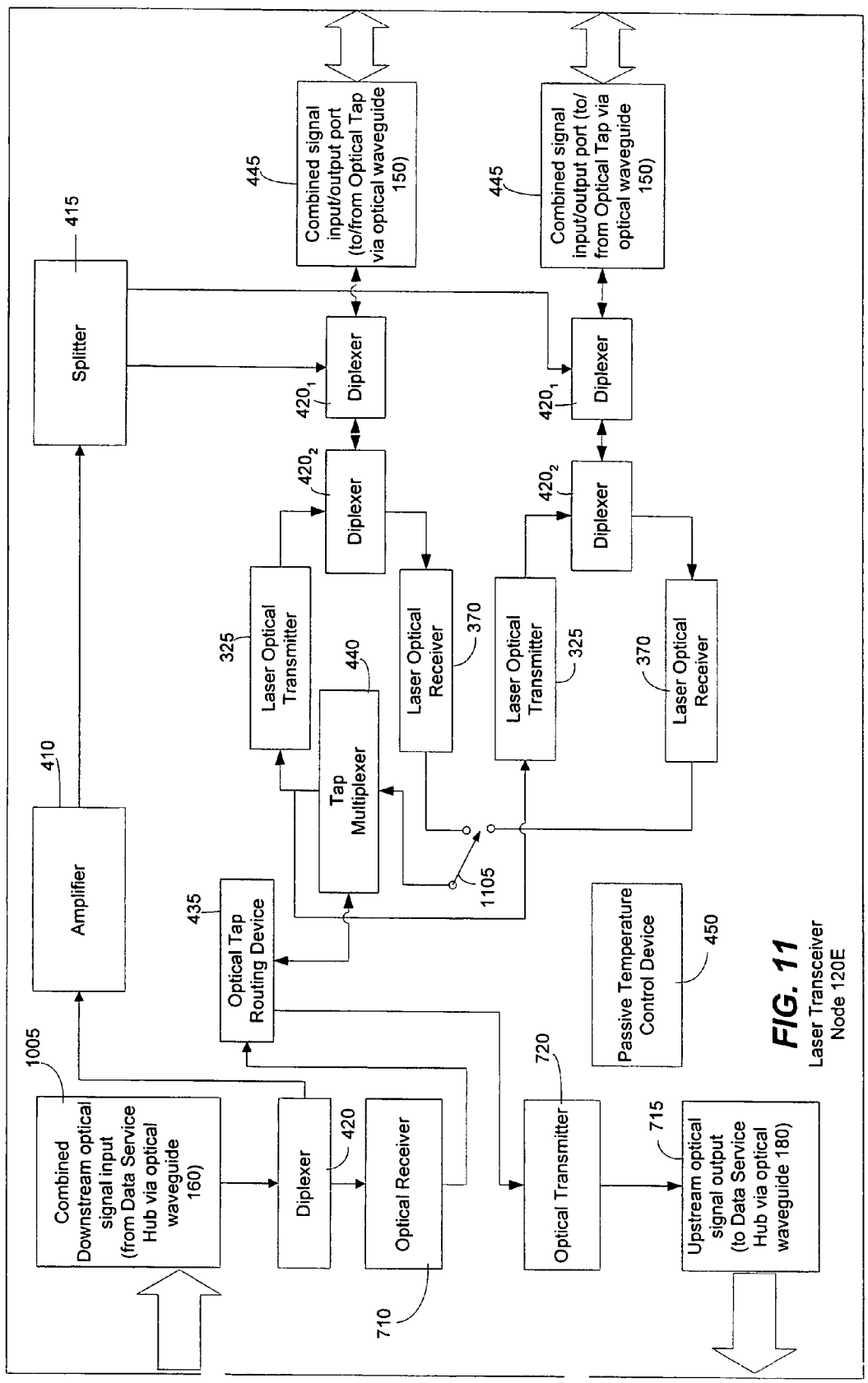
FIG. 11 is a functional block diagram illustrating another exemplary outdoor laser transceiver node that employs dual transceivers between tap multiplexers and respective groups of subscribers.

FIG. 11 is a functional block diagram illustrating another exemplary outdoor laser transceiver node 120E that employs dual transceivers between tap multiplexers 440 and respective groups of subscribers. In this embodiment the downstream optical signals originating from each respective tap multiplexer 440 are split immediately after the tap multiplexer 440. In this exemplary embodiment, each optical transmitter 325 is designed to service only eight subscribers as opposed to sixteen subscribers of other embodiments. But each tap multiplexer 440 typically services sixteen or fewer subscribers.

In this way, the splitting loss attributed to the optical taps 130 can be substantially reduced. For example, in other exemplary embodiments that do not split the downstream optical signals immediately after the tap multiplexer 440, such embodiments are designed to service sixteen or fewer subscribers with a corresponding theoretical splitting loss of approximately 14 dB (including an allowance for losses). With the current exemplary embodiment that services eight or fewer subscribers, the theoretical splitting loss is reduced to approximately 10.5 dB.

In laser transceiver node 120E, the optical receivers 370 cannot be paralleled because at all times one receiver 370 or the other is receiving signals from respective subscribers, while the other receiver 370 is not receiving signals. The receiver 370 not receiving any upstream optical signals could output noise which would interfere with reception from the receiver 370 receiving upstream optical signals. Therefore, a switch 1105 can be employed to select the optical receiver 370 that is currently receiving an upstream optical signal. The tap multiplexer can control the switch 1105 since it knows which optical receiver 370 should be receiving upstream optical signals at any given moment of time.

FIG. 12 is a functional block diagram illustrating another exemplary outdoor laser transceiver node 120F that includes optical taps 130 disposed within the laser transceiver node 120F itself. In this architecture, optical waveguides 150 from each subscriber optical interface 140 can be connected to the laser transceiver node 120F. Typically, the number of optical waveguides 150 that may conveniently be brought to one location is such that at least two laser transceiver nodes 150 are needed to support the number of optical waveguides 150. But when less than a maximum number of subscribers exist, one laser transceiver node 120F can be used to service the existing service base. When the service base expands to a number requiring an additional laser transceiver node 120, the additional laser transceiver nodes can be added.

By placing the optical taps 130 within the laser transceiver node 120F, two or more laser transceiver nodes 120F can be co-located with one another for the reason discussed above.

In other words, this exemplary embodiment enables two or more laser transceiver nodes 120F to be placed in close proximity to one another. Such placement of laser transceiver nodes 120F can conserve power and result in significant cost savings. Furthermore, with such a co-location design, future expansion of the optical architecture 100 can easily be obtained. That is, one laser transceiver nodes 120F can be installed until more subscribers join the optical network architecture 100 requiring the laser transceiver node. Optical waveguides 150 can be connected to the co-located laser transceiver nodes as more subscribers join the optical network architecture 100.

Figure 13:
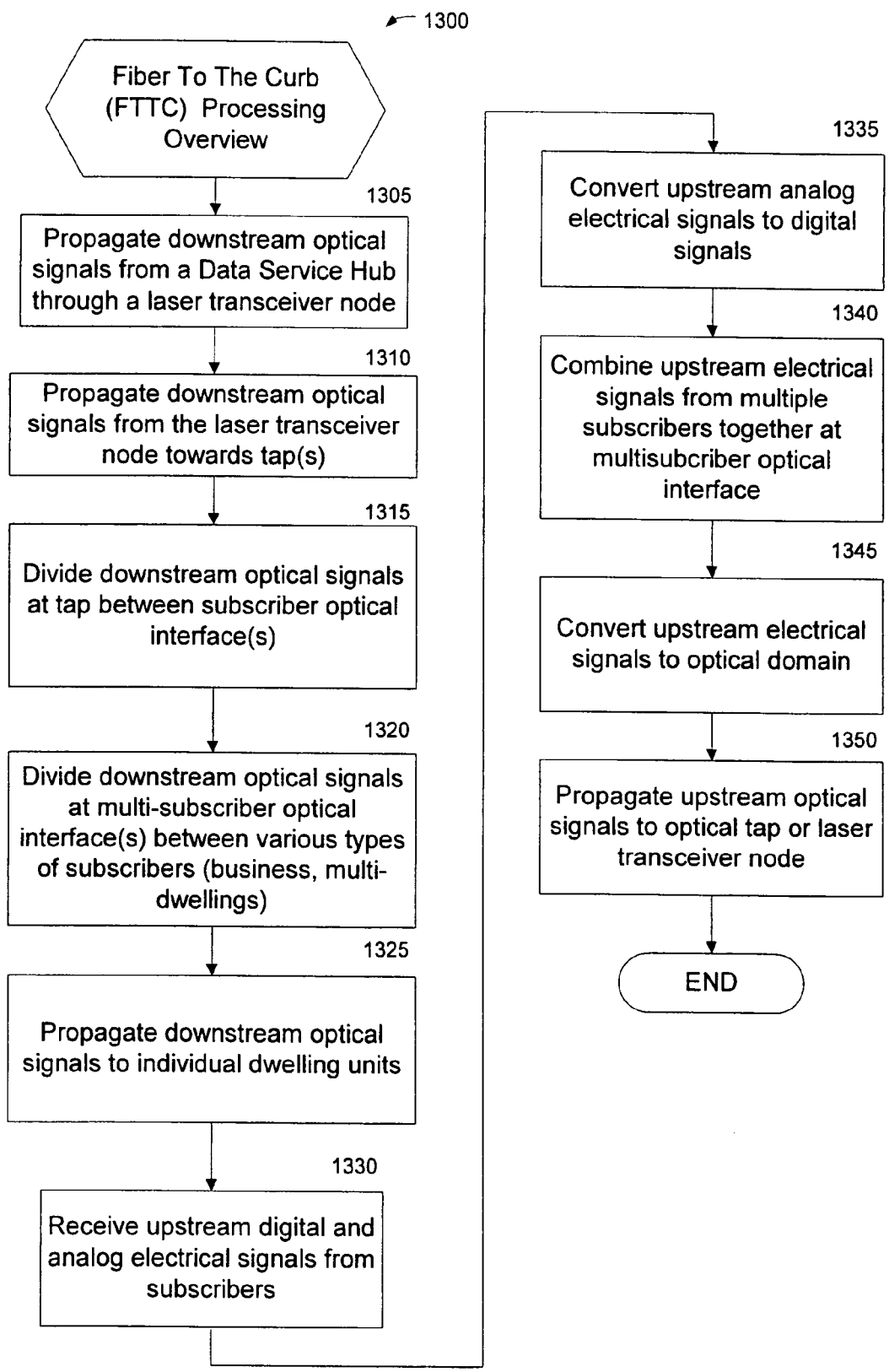
FIG. 13 is a logic flow diagram illustrating an exemplary method for servicing multiple subscribers with various demands in bandwidth in accordance with the present invention.

Referring now to FIG. 13, this figure illustrates an exemplary method for communicating optical signals to multiple subscribers with various bandwidth demand on a single optical wave guide. In other words, FIG. 13 illustrates a fiber to the curb (FTTC) processing overview.

The description of the flow charts in the this detailed description are represented largely in terms of processes and symbolic representations of operations by conventional computer components, including a processing unit (a processor), memory storage devices, connected display devices, and input devices. Furthermore, these processes and operations may utilize conventional discrete hardware components or other computer components in a heterogeneous distributed computing environment, including remote file servers, computer servers, and memory storage devices. Each of these conventional distributed computing components can be accessible by the processor via a communication network.

The processes and operations performed below may include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Certain steps in the process described below must naturally precede others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

Step 1305 is the first step in the exemplary Fiber-to-the-curb processing overview. In step 1305, downstream RF and data optical signals are propagated from a data service hub 110 through a laser transceiver node 120. Next, in step 1310, the downstream RF and data optical signals are propagated from the laser transceiver node 120 toward one or more optical tap 130. However, those skilled in the art will appreciate that optical tap 130 in this particular step in process 1300 could be eliminated without departing from the scope and spirit of the present invention.

In step 1315, the downstream RF and data optical signals are divided between subscriber optical interfaces 140 at the tap 130. In step 1320, the downstream optical signals at multi-subscriber optical interfaces 140A are further divided between various types of subscribers that may include businesses as well as home or personal-use subscribers. A business subscriber may comprise a small or large business that typically has bandwidth demands that are greater than those of a home or personal-use subscriber. A personal use or home subscriber may comprise a household or single family dwelling unit that may include a personal computer.

In step 1325, the downstream RF and data optical signals can also be propagated through single subscriber optical interfaces 140B to individual dwelling units. Individual dwelling units may comprise single family homes that are physically separate from one another compared to a multiple dwelling unit such as an apartment complex.

In step 1330, each subscriber optical interface 140 can receive upstream digital and analog electrical signals from respective subscribers. In step 1335, the upstream analog electrical signals can be converted to digital signals. For example, RF return signals from Legacy terminals 581 can be digitized as discussed above. Similarly, analog phone signals from a subscriber telephone device 585 may be converted from analog signals to digital form.

In step 1340, upstream electrical signals from multiple subscribers can be combined together at a multi-subscriber optical interface. For example, upstream telephone signals from different subscriber telephone units can be combined. Similarly, the RF return paths for various subscribers can be combined into a single input. Also, upstream data can be combined from multiple subscribers with the data router 513 as discussed above.

In step 1345, each of the converted or digitized electrical upstream signals can then be converted to the optical domain by either the digital optical transmitter 530 or the AM optical transmitter 561. In step 1350, the upstream optical signals can be propagated to an optical tap 130 or to the laser transceiver node 120 directly.

Figures 14, 15:
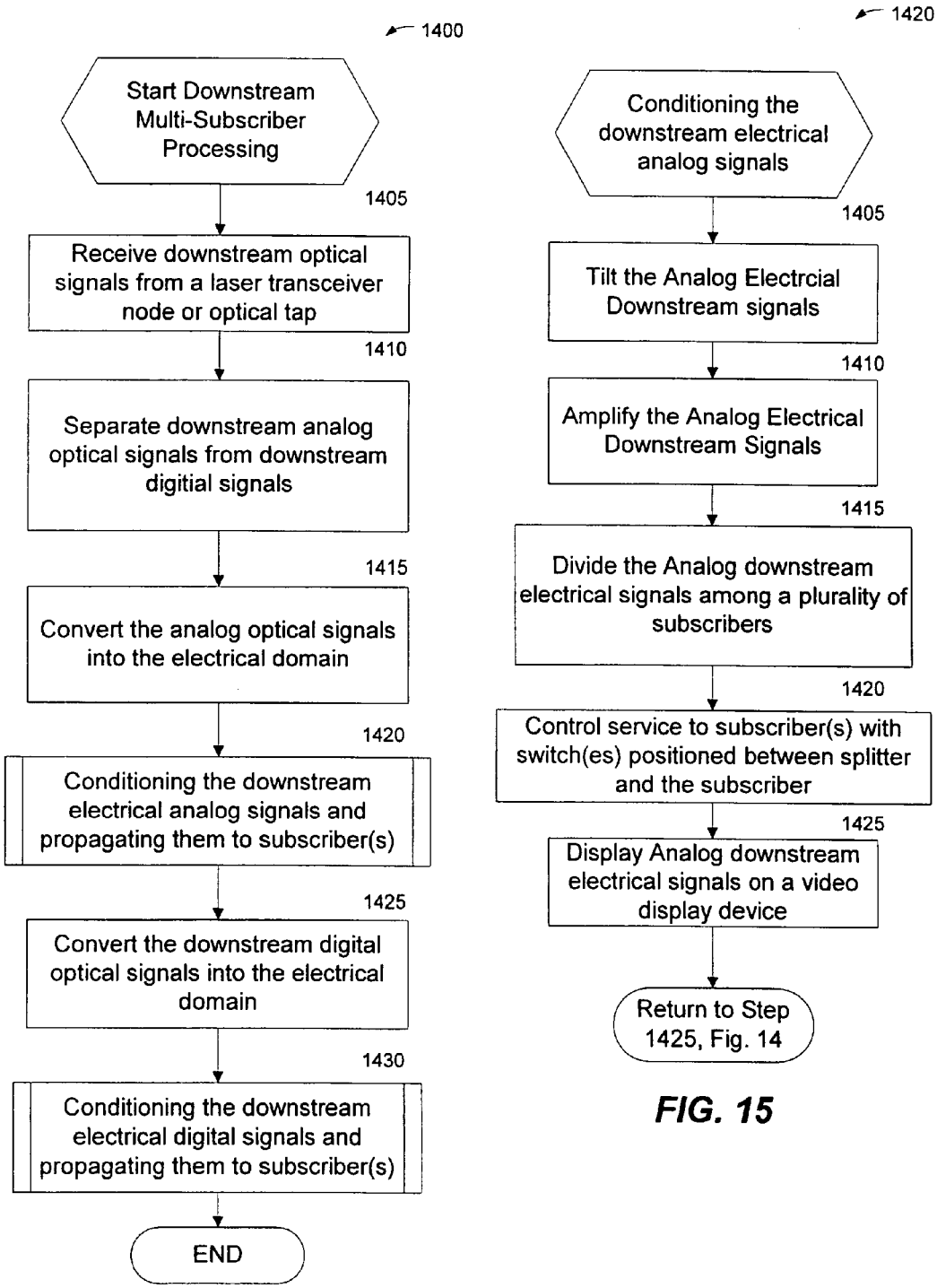
FIG. 14 is a logic flow diagram illustrating an exemplary process for handling downstream optical signals according to the present invention.
FIG. 15 is a logic flow diagram illustrating an exemplary process for conditioning the downstream electrical analog signals according to the present invention.

Referring now to FIG. 14, this figure illustrates an exemplary method for downstream multi-subscriber processing. Step 1405 is the first step in the process in which downstream RF and data optical signals are received from the laser transceiver node 120 or an optical tap 130. Next, in step 1410, the downstream optical signals are separated from the downstream digital signals in the optical diplexer 515. Next, the analog optical signals are converted into the electrical domain with the analog optical receiver 525. Subsequently, and in routine 1420, the downstream electrical analog signals are conditioned and then propagated to respective subscribers. Further details of routine 1420 will be discussed below with respect to FIG. 15.

After routine 1420, in step 1425, the downstream digital optical signals are converted into the electrical domain with the digital optical receiver 540. Next, in routine 1430, the downstream electrical digital signals are conditioned and propagated to respective subscribers. Further details of routine 1430 will be discussed below with respect to FIG. 16.

Referring now to FIG. 15, this figure illustrates an exemplary method for conditioning the downstream electrical analog signals received by a multi-subscriber optical interface 140A. Routine 1420 begins with step 1505 in which the analog electrical downstream signals are tilted with a tilt network 531. The tilt network 531 attenuates lower frequency signals to bring the signal strength across the frequency range back into balance. As noted above, higher frequencies loose signal strength faster than lower frequencies as they are being transmitted through coaxial cables. The tilt network of 531 balances frequencies by attenuating the lower frequencies.

Next, in step 1510, the analog electrical downstream signals are amplified with an amplifier 529. Next, in step 1515, the analog downstream electrical signals are divided among a plurality of subscribers with a RF splitter 531. In step 1520, service to individual subscribers can be controlled with disconnect switches 527. In step 1525, the analog downstream electrical signals can be displayed on a video display device 580. A process then returns to step 1425 of FIG. 14.

Figure 16:
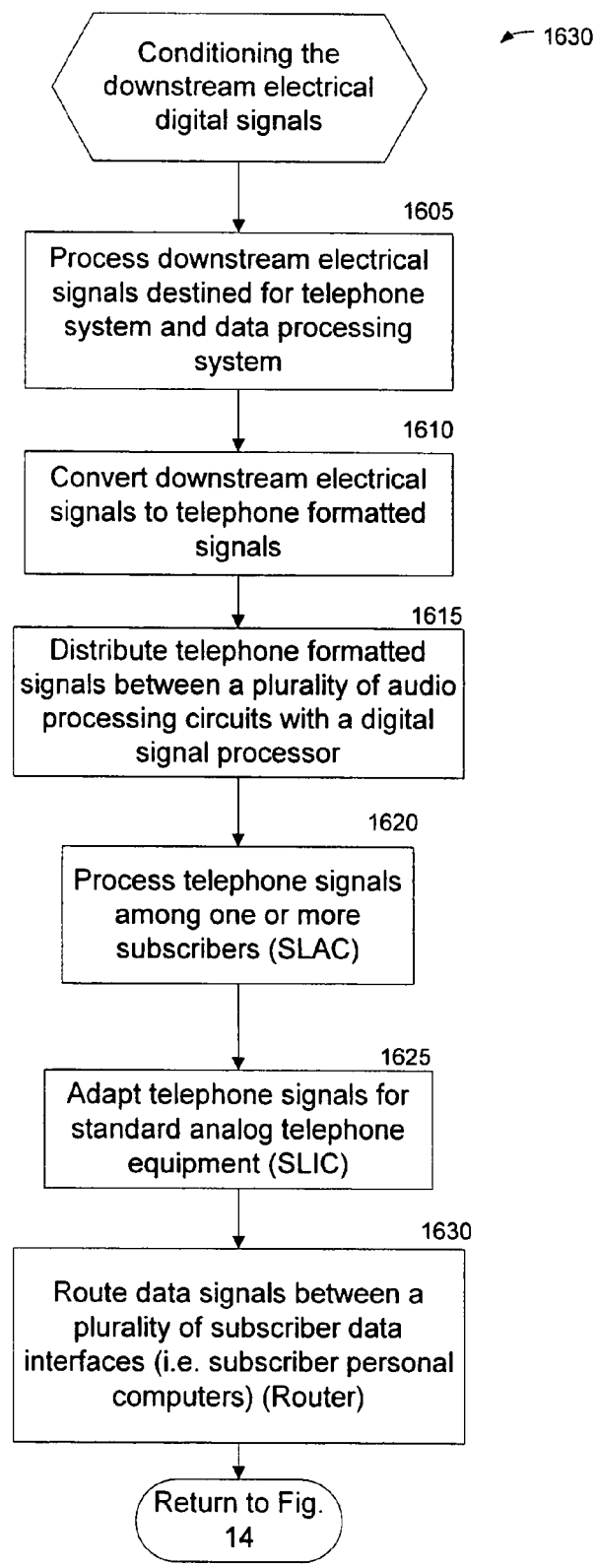
FIG. 16 is a logic flow diagram illustrating an exemplary process for conditioning downstream electrical digital signals according to the present invention.

Referring now to FIG. 16, this figure illustrates an exemplary method 1430 for conditioning the downstream electrical signals. Specifically, routine 1430 begins with step 1605 in which the downstream electrical data signals are processed with a microcomputer 503 and sent to a data processing system such as a data router 513. Microprocessor 513 can process data signals associated with a telephone system as well as well as data signals destined for subscriber optical interface computers. The microprocessor 513 can control switch 501 that is coupled to the digital optical transmitter 30. Next, in step 1610, the downstream electrical signals are converted to telephone formatted signals in microcomputer 503. The telephone formatted signals are then distributed between a plurality of audio processing circuits 509 with a digital signal processor 507.

In step 1620, the telephone signals are further processed with one or more subscriber line audio circuits (SLICs) 509. In step 1625, the telephone signals can be adapted to standard analog telephone equipment with subscriber line interface circuits 511. In step 1630, data signals received from the switch 501 can be routed between a plurality of subscriber data interfaces 560 with the data router 513.

Figure 17:
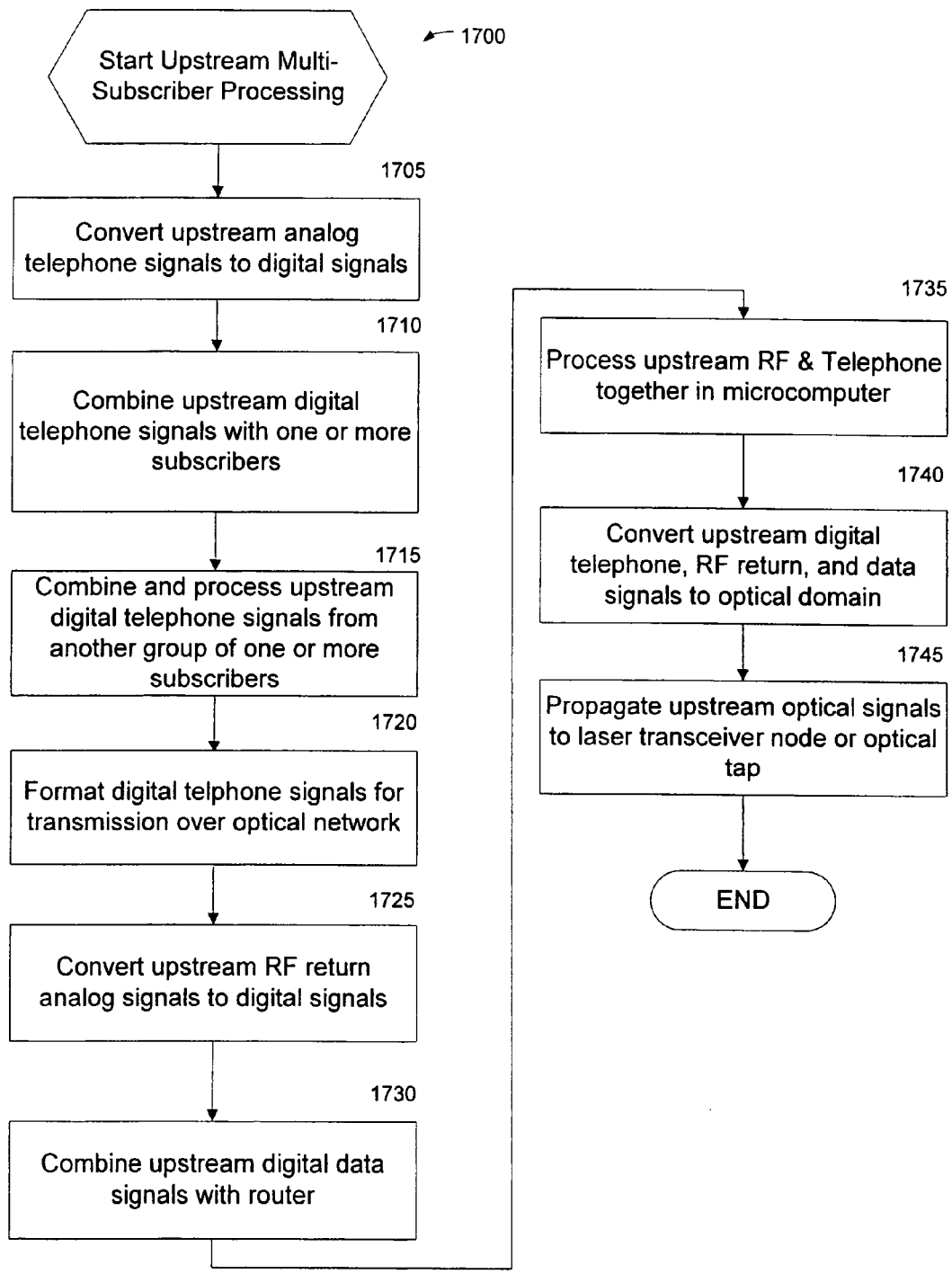
FIG. 17 is a logic flow diagram illustrating a method for handling upstream signals with a multiple subscriber optical interface.

Referring now to FIG. 17, this figure illustrates an exemplary method for upstream multi-subscriber optical interface processing. Method 1700 begins with step 1705 in which upstream analog telephone signals are converted to digital signals with subscriber line interface circuits 511. Next, in step 1710, upstream digital telephone signals can be combined with one or more telephone signals from other subscribers in a subscriber line audio circuit 509.

In step 1715, upstream digital telephone signals can be further combined and processed with other groups of subscribers with a digital signal processor 507. Next, in step 1720, a digital telephone signals received from the digital signal processor 507 can be formatted further by a microcomputer 503 for transmission over an optical network.

In step 1725, upstream RF return analog signals can be converted to digital signals with an analog-to-digital converter 537. In step 1730, upstream digital data signals received from subscriber data devices 590 can be combined with a data router 513. In step 1735, RF return signals and telephone signals can be processed together in a micro-computer 503. In step 1740, the upstream digital telephone, RF return, and data signals can be converted to the optical domain with a digital optical transmitter 530. In step 1745, the upstream optical signals can be propagated towards a laser transceiver node 120 or an optical tap 130.

The present invention provides a method and system for communicating optical signals to multiple subscribers having various bandwidth demands on a single optical waveguide. The present invention services multiple subscribers along the same optical waveguide irrespective of the demand for bandwidth imposed by each subscriber of the network. The optical network architecture of the present invention provides a central service disconnection point for a plurality of subscribers in a centralized location.

Further, the present invention positions tilt networks in a centralized location when servicing multiple subscribers of an optical network. In addition to the centralized tilt network, the present invention also provides a return path for RF signals that are generated by legacy video service terminals. The method and system for communicating optical signals between a data service provider and subscriber preserves the upstream transmission timing scheme that is controlled by a legacy video service controller.

The optical network system according to the present invention lends itself to efficient upgrading that can be performed entirely on the network side. The upgrading can comprise replacing off-the-shelf parts with other off-the-shelf parts to reduce costs that may be associated with repairs.

The optical network architecture of the present invention can take advantage of relatively inexpensive hardware components that typically service shorter distances than their expensive counterparts that service optical signals over large distances. The system comprises a computer system and method that can allocate additional or reduced bandwidth based upon the demand of one or more subscribers on an optical network.

It should be understood that the foregoing relates only to illustrate the embodiments of the present invention, and that numerous changes may be made therein without departing from the scope and spirit of the invention as defined by the following claims.

What is claimed is:

1. An optical network system comprising:
   a data service hub for producing downstream optical signals comprising video information;
   at least one optical tap;

at least one multi-subscriber optical interface connected to the optical tap for servicing two or more subscribers, the multi-subscriber optical interface comprising an analog optical receiver for converting the downstream optical signals from the data service hub into downstream electrical signals destined for subscribers, an RF splitter for dividing the downstream electrical signals between at least two electrical waveguides, a service disconnect switch coupled to each electrical waveguide for controlling video service for respective subscribers, the service disconnect switch having a first state that prevents all downstream video signals from reaching a respective subscriber, the service disconnect switch having a second state which allows video signals to pass through the service disconnect switch to a respective subscriber, the service disconnect switch being alternatable between the first and second states, each multi-subscriber optical interface further comprising a processor and a first routing device for managing upstream and downstream electrical, data, non-video signals and which operates independently and without controlling the service disconnect switch, and the first routing device using a first look-up table for managing at least one of upstream and downstream electrical signals;

a laser transceiver node disposed between and coupled to the data service hub and the optical tap, for communicating optical signals between the data service hub and the optical tap, the laser transceiver node comprising a second routing device for apportioning bandwidth in an electrical domain between subscribers of the optical network system and using a second look-up table for managing at least one of upstream and downstream electrical signals, and one or more optical waveguides connected between that at least one optical tap, the laser transceiver node, and the least one multi-subscriber optical interface, for carrying the upstream optical signals and the downstream optical signals, whereby optical bandwidth for subscribers is controllable by at least one of the laser transceiver node and multi-subscriber optical interface in response to subscriber demand.

2. The optical network system of claim 1, further comprising a tilt network for increasing signal strength across a frequency range suitable for coaxial cable transmissions.

3. The optical network system of claim 1, wherein the multi-subscriber optical interface further comprises an RF return path.

4. The optical network system of claim 1, wherein the laser transceiver node comprises passive cooling devices in order to operate in a temperature range between −40 degrees Celsius to 60 degrees Celsius.

5. The optical network system of claim 1, wherein the laser transceiver node is mountable on a strand in an overhead plant environment.

6. The optical network system of claim 1, wherein the laser transceiver node is housed within a pedestal in an underground plant environment.

7. The optical network system of claim 1, wherein a distance between the laser transceiver node and the data service hub comprises a range between zero and eighty kilometers.

8. The optical network system of claim 1, wherein the laser transceiver node comprises at least one optical transmitter, each optical transmitter comprises one of a Fabry-Perot laser, a distributed feedback laser, and a vertical cavity surface emitting laser (VCSEL).

9. The optical network system of claim 1, wherein the system supports one or more protocols and one of the protocols comprises a time division multiple access protocol.

10. The optical network system of claim 1, wherein data bit rates for the upstream and downstream optical signals are substantially symmetrical.

11. The optical network system of claim 1, wherein each optical tap comprises at least one optical splitter.

12. An optical network system comprising:
a data service hub for producing downstream optical signals comprising video information;
at least one optical tap;
a least one single-subscriber optical interface connected to the optical tap for servicing a subscriber;
at least one multi-subscriber optical interface connected to the optical tap for servicing two or more subscribers, the multi-subscriber optical interface comprising an analog optical receiver for converting the downstream optical signals from the data service hub into downstream electrical signals destined for subscribers, a tilt network coupled to the analog optical receiver for increasing signal strength across a frequency range suitable for coaxial cable transmissions, an RF splitter coupled to the tilt network for dividing the downstream electrical signals between at least two electrical waveguides, a service disconnect switch coupled to each electrical waveguide for controlling video service for respective subscribers, the service disconnect switch having a first state that prevents all downstream video signals from reaching a respective subscriber, the service disconnect switch having a second state which allows video signals to pass through the service disconnect switch to a respective subscriber, the service disconnect switch being alternatable between the first and second states, each multi-subscriber optical interface further comprising a processor and a first routing device for managing upstream and downstream electrical signals, and the first routing device using a first look-up table for managing at least one of upstream and downstream electrical signals;

a laser transceiver node disposed between the data service hub and the optical tap, for communicating optical signals between the data service hub and the optical tap, and the laser transceiver node comprising a second routing device for apportioning bandwidth in an electrical domain between subscribers of the optical network system and using a second look-up table for managing at least one of upstream and downstream electrical, data, non-video signals and which operates independently and without controlling the service disconnect switch, and one or more optical waveguides connected between respective optical taps, the laser transceiver node, the at least one single-subscriber optical interface, and the at least one multi-subscriber optical interface, for carrying the upstream optical signals and the downstream optical signals, whereby optical bandwidth for subscribers is controllable by one of a laser transceiver node and the at least one multi-subscriber optical interface in response to subscriber demand.

13. The optical network system of claim 12, wherein the multi-subscriber optical interface further comprises an RF return path.

14. The optical network system of claim 12, wherein the at least one optical tap comprises an optical splitter.

15. The optical network system of claim 12, wherein the at least one optical tap services a particular group of subscribers and is connected to another optical tap.

16. An optical network system comprising:

a data service hub for producing downstream optical signals comprising video information;

at least one optical tap;

at least one multi-subscriber optical interface connected to the optical tap for servicing two or more subscribers, the at least one multi-subscriber optical interface comprising an analog optical receiver for converting the downstream optical signals from the data service hub into downstream electrical signals destined for subscribers, an RF splitter for dividing the downstream electrical signals between at least two electrical waveguides, a service disconnect switch coupled to each electrical waveguide for controlling video service for respective subscribers, the service disconnect switch having a first state that prevents all downstream video signals from reaching a respective subscriber, the service disconnect switch having a second state which allows video signals to pass through the service disconnect switch to a respective subscriber, the service disconnect switch being alternatable between the first and second states, each multi-subscriber optical interface further comprising a processor and a first routing device for managing upstream and downstream electrical signals, and the first routing device using a first look-up table for managing at least one of upstream and downstream electrical signals;

a laser transceiver node disposed between the data service hub and the optical tap, for communicating optical signals between the data service hub and the optical tap, and the laser transceiver node comprising a second routing device for apportioning bandwidth in an electrical domain between subscribers of the optical network system and using a second look-up table for managing at least one of upstream and downstream electrical, data, non-video signals and which operates independently and without controlling the service disconnect switch, and one or more optical waveguides connected between respective optical taps and the laser transceiver node, and the at least one multi-subscriber optical interface, for carrying the upstream optical signals and the downstream optical signals, whereby optical bandwidth for subscribers is controllable by one of the laser transceiver node and a multi-subscriber optical interface in response to subscriber demand.

17. The optical network system of claim 16, the multi-subscriber optical interface comprising a tilt network coupled to the analog optical receiver and RF splitter for increasing signal strength across a frequency range suitable for coaxial cable transmissions.

18. The optical network system of claim 16, wherein the multi-subscriber optical interface comprises a service disconnect switch coupled to each electrical waveguide for controlling video service for respective subscribers.

19. The optical network system of claim 16, wherein the multi-subscriber optical interface comprises an RF return path that includes at least one of a diplexer and an analog-to-digital (A/D) converter.

* * * * *